(12) United States Patent
Chen et al.

(10) Patent No.: US 7,315,824 B2
(45) Date of Patent: Jan. 1, 2008

(54) INTERNET PRINTING BY HOTEL GUESTS

(75) Inventors: Paul Chen, Huntington Beach, CA (US); Don Francis Purpura, Yorba Linda, CA (US); Martin Ervin Page, Tustin, CA (US); Katayoun Shoa, Redondo Beach, CA (US); Hye-Sook Kim Lee, Cypress, CA (US); Yokichi Joe Tanaka, Foothill Ranch, CA (US)

(73) Assignee: Canon Development Americas, Inc., Irvine, CA (US)

( * ) Notice: Subject to any disclaimer, the term of this patent is extended or adjusted under 35 U.S.C. 154(b) by 1081 days.

(21) Appl. No.: 10/000,468

(22) Filed: Dec. 4, 2001

(65) Prior Publication Data

US 2003/0105643 A1 Jun. 5, 2003

(51) Int. Cl.
*G06Q 10/00* (2006.01)
*H04L 9/00* (2006.01)

(52) U.S. Cl. .......................................... 705/1; 713/165
(58) Field of Classification Search ................ 705/1, 705/44; 713/155, 176; 379/130, 93.25; 358/1.9, 1.15; 320/132; 709/223
See application file for complete search history.

(56) References Cited

U.S. PATENT DOCUMENTS

| | | | |
|---|---|---|---|
| 4,899,373 A | 2/1990 | Lee et al. ..................... | 379/207 |
| 5,392,351 A | 2/1995 | Hasebe et al. ................. | 380/4 |
| 5,425,081 A | 6/1995 | Gordon et al. ............... | 379/100 |
| 5,485,510 A | 1/1996 | Colbert ........................ | 379/145 |
| 5,600,762 A | 2/1997 | Salgado et al. .............. | 395/114 |
| 5,606,613 A | 2/1997 | Lee et al. ....................... | 380/21 |
| 5,633,932 A * | 5/1997 | Davis et al. ................. | 713/176 |
| 5,720,012 A | 2/1998 | McVeigh et al. ........... | 395/113 |
| 5,752,697 A | 5/1998 | Mandel et al. .............. | 271/288 |
| 5,826,245 A * | 10/1998 | Sandberg-Diment ......... | 705/44 |

(Continued)

OTHER PUBLICATIONS

Harry Newton, Newton's Telecom Dictionary, CMP Books, 20th Edition, pp. 737 (Server) & 774 (Spooling).*

(Continued)

*Primary Examiner*—John G. Weiss
*Assistant Examiner*—Gerardo Araque, Jr.
(74) *Attorney, Agent, or Firm*—Fitzpatrick, Cella, Harper & Scinto

(57) ABSTRACT

Printing over a network, such as the Internet, by uploading, via the network, to a printing service provider, print data information and location information, determining identification information based on the uploaded location information, correlating, at the printing service provider, the determined identification information with the uploaded print data information, inputting the identification information at a printing device connected to the network, transmitting the print data information having the correlated identification information to the printing device, and printing the print data information on the printing device. The location information may be a network address from which the uploading step is initiated, where the network address is dynamically determined by a hotel server when a user connects a computing device to a network connection in the hotel. After the uploading step, the printing service provider may query the hotel server for the identification information, with the hotel server determining the identification and transmitting the identification information to the printing service provider in response. The location information may comprise hotel information and the identification information may comprise hotel room key information or credit card information.

25 Claims, 20 Drawing Sheets

U.S. PATENT DOCUMENTS

| | | | |
|---|---|---|---|
| 5,852,744 A | 12/1998 | Agatone et al. | 395/837 |
| 5,862,321 A | 1/1999 | Lamming et al. | 395/200.3 |
| 5,867,633 A * | 2/1999 | Taylor et al. | 358/1.9 |
| 5,903,646 A | 5/1999 | Rackman | 380/4 |
| 5,905,248 A | 5/1999 | Russell et al. | 235/462 |
| 5,930,465 A | 7/1999 | Bellucco et al. | 395/114 |
| 5,933,498 A | 8/1999 | Schneck et al. | 380/4 |
| 5,933,501 A | 8/1999 | Leppek | 380/21 |
| 5,949,881 A | 9/1999 | Davis | 380/25 |
| 5,982,996 A | 11/1999 | Snyders | 395/114 |
| 6,023,682 A | 2/2000 | Checchio | 705/18 |
| 6,025,925 A | 2/2000 | Davidson, Jr. et al. | 358/1.15 |
| 6,052,675 A | 4/2000 | Checchio | 705/44 |
| 6,061,668 A | 5/2000 | Sharrow | 705/400 |
| 6,064,838 A | 5/2000 | Maruta et al. | 399/79 |
| 6,067,352 A * | 5/2000 | Douhet et al. | 379/93.25 |
| 6,076,076 A | 6/2000 | Gottfreid | 705/45 |
| 6,151,464 A | 11/2000 | Nakamura et al. | 399/79 |
| 6,157,945 A | 12/2000 | Balma et al. | 709/206 |
| 6,181,436 B1 | 1/2001 | Kurachi | 358/1.15 |
| 6,195,420 B1 * | 2/2001 | Tognazzini | 379/130 |
| 6,378,070 B1 * | 4/2002 | Chan et al. | 713/155 |
| 6,714,964 B1 * | 3/2004 | Stewart et al. | 709/203 |
| 6,930,465 B2 * | 8/2005 | Kishi et al. | 320/132 |
| 6,978,299 B1 * | 12/2005 | Lodwick | 709/223 |
| 2002/0015179 A1 * | 2/2002 | Igarashi et al. | 358/1.15 |

OTHER PUBLICATIONS

Harry Newton, Newton's Telecom Dictionary 17th Edition, Published 2001, pp. 614-615 "server".*

Dannenberg, Roger B., et al., "A Butler Process for Resource Sharing on Spice Machines", ACM Transactions on Office Information Systems, vol. 3, No. 3, pp. 234-252, Jul. 1985.

kinkos.com website, visited on Mar. 14, 2001.

www.mimeo.com, http://web.archive.org/web/20011129092024/http://mimeo.com/, archive of site as posted on Nov. 29, 2001.

* cited by examiner

| FIG. 17A |
| FIG. 17B |

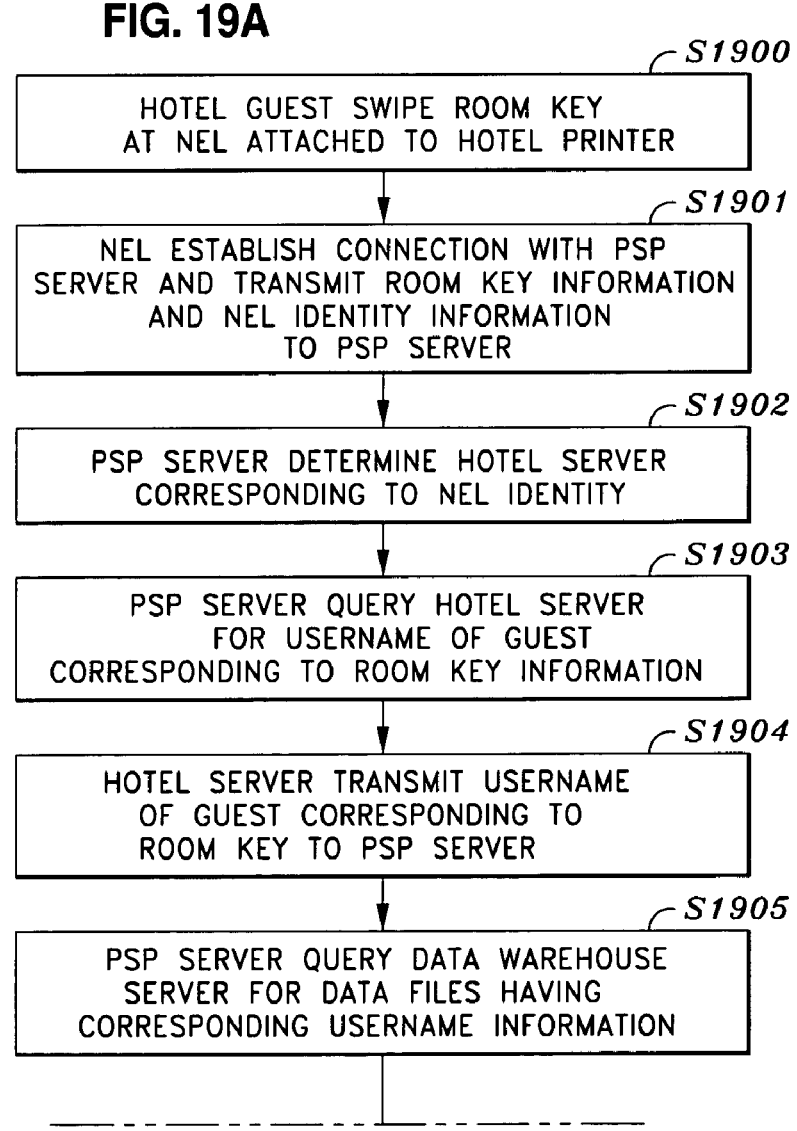

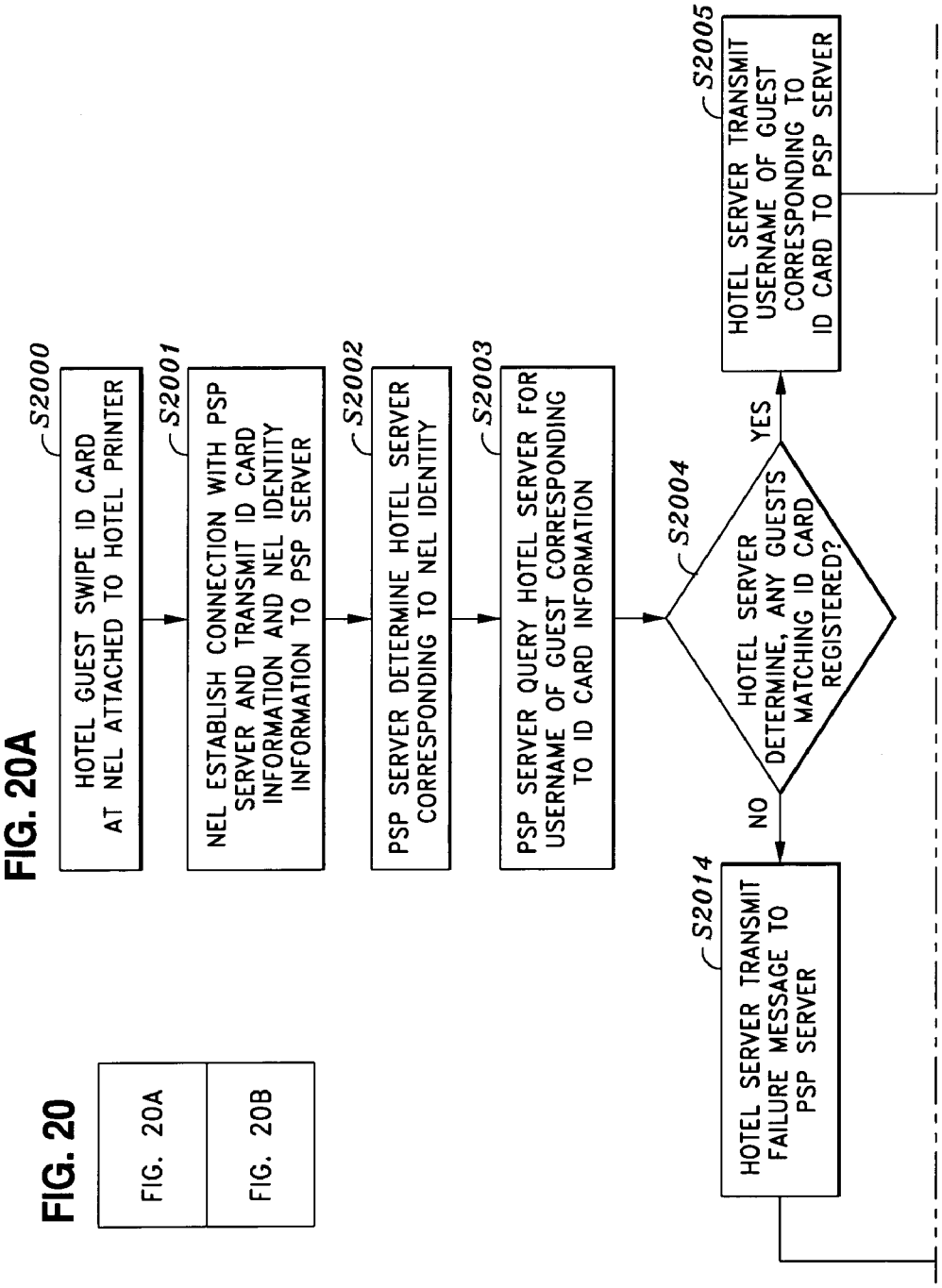

INTERNET PRINTING BY HOTEL GUESTS

BACKGROUND OF THE INVENTION

1. Field of the Invention

The present invention relates to printing over a network by hotel guests using the guests room key information as a means of identification. More specifically, the present invention relates to hotel guests uploading a print job to an Internet printing service provider and retrieving the print job at a hotel printer by presenting their room key to a key reading device at the printer.

2. Description of the Related Art

Internet and business related services provided by hotels to their guests have become increasingly popular. For example, some hotels provide Internet access for their guests via telephone jacks in their guest rooms, for which their guests can use a conventional telephone modem within their laptop computer to connect to the Internet. Hotels may also include an in-room multifunction device for their guests to receive and send facsimiles, to make photocopies, or to scan a document. However, one service that has been somewhat problematic for hotels to provide to their guests is the ability to print documents on a hotel printer.

To provide printing capabilities to their guests, some hotels require that the guest submit a floppy disk containing the information to be printed to the front desk clerk, who then can print the information for the guest utilizing the hotel's printer. One problem with this approach however, is that the size of the file that can be printed is limited by the amount of data (1.44 MB) that can be stored on the floppy disk.

Some hotels may also include a centrally located business center in the hotel that includes a computer workstation and a printer. To print a document, the guest takes their floppy disk, or other computer readable medium containing the information to be printed, to the business center where they can then print the document utilizing the business center's computer and printer. However, one problem with this approach, which is also a problem with the foregoing floppy disk approach, is that the hotel's computer must have a software application program that is capable of reading and printing the information. As a result, the hotel needs to invest in numerous different application programs and install them on their computer in order for the guest to be able to print the information. Of course, the number of different software applications is too numerous for each hotel to make such an investment, and therefore, the ability for some hotel guests to have their information printed is limited to only a few of the most common application programs. Moreover, the central business center generally only has a limited number of computers and therefore, some guests may not be able to utilize the business center if the computers are already being used by other guests. This approach also requires that the guest leave their hotel room, thereby inconveniencing the guest.

Some hotels also provide network connections for their guests so that the guest can print directly from their laptop to the central business center's printer. However, this approach requires that the hotel's guests have the printer driver for the business center's printer installed on their laptop, which may or may not always be possible, but which certainly inconveniences the guests.

One approach that addresses the foregoing has been described in co-pending U.S. patent application Ser. No. 09/903,940 (hereinafter referred to as "the '940 application") filed on Jul. 12, 2001 and entitled "Printing With Credit Card As Identification", the contents of which are incorporated by reference as set forth in full herein. In the '940 application's approach, a user accesses an Internet printing service website (such as www.DocGo.net) to upload a print job. Upon accessing the website, the user selects a file or files to upload for printing and enters credit card information (e.g. credit card number, name, expiration date, etc.). The selected file(s) and credit card information are uploaded to a server where they are stored until printing is initiated. To print the print job, the user goes to a printer that is part of the Internet printing network (i.e., communicates with the server) and swipes their credit card through a credit card reader connected to the printer. The credit card information is communicated to the server which then renders the print job in an appropriate format based on the type of printer that the credit card was swiped at, and transmits the rendered print data to the printer, where it is processed and printed out.

As can readily be seen in the '940 application's approach, the hotel guest can upload their print job from their hotel room (using a modem connection) and does not need to utilize the hotel's business center computer to print the print job. However, some hotel guests may not possess a credit card or may not want to have their credit card information transmitted across the Internet, regardless of the level of security provided by the connection to protect the credit card number. In this case, a way to have hotel guests print their print jobs over the Internet in a way that is different from the '940 application's approach is desirable and the present invention provides just such a solution.

SUMMARY OF THE INVENTION

The present invention addresses the foregoing by a user (such as a hotel guest) uploading, via the Internet, print data and location information (such as information identifying a particular hotel), to a printing service server. After receiving the foregoing, the printing service server queries a server corresponding to the location (hotel) information for identification information (such as hotel room key information). Upon receiving the identification information, the printing service server stores the identification information in correspondence with the print data and waits for a printing operation to be initiated. To commence printing, the user (hotel guest) merely presents their hotel room key to a printer in the hotel (e.g., swiping a card type room key through a card reader). The printer transmits the identification (room key) information to the printing service server, which in turn, transmits the print data corresponding to the identification information to the printer where it is printed out.

As a result, a hotel guest can upload a print job via the Internet merely by connecting their laptop computer to a network connection in their hotel room and accessing a website for the printing service. The location information uploaded with the print data is transparent to the hotel guest and the servers perform the operations to transmit the identification information for the guest to be able to retrieve the print job at the printer. Thus, there is no need for the user's credit card information or other personal information to be transmitted across the Internet.

Thus, in one aspect the invention performs printing over a network, such as the Internet, by uploading, via the network, to a printing service provider, print data information and location information, determining identification information based on the uploaded location information, correlating, at the printing service provider, the determined identification information with the uploaded print data information, inputting the identification information at a printing device connected to the network, transmitting the print data information having the correlated identification information from the printing service provider to the printing device, and printing the print data information on the printing device. The location information may be a network address from which the uploading step is initiated, where the network address is dynamically determined by a hotel server when a user connects a computing device to a network connection in the hotel. After uploading, the printing service provider may query a hotel server for the identification information, with the hotel server transmitting the identification information to the printing service provider in response. Alternatively, the location information may comprise hotel information and the identification information may comprise hotel room key information or credit card information.

In another aspect, the invention provides for Internet printing by hotel guests by a server apparatus detecting connection of a client computer to a local area network connected to the server apparatus, assigning a network address to the detected client computer, receiving a query from another server apparatus connected to the Internet for identification information corresponding to the assigned network address, determining the identification information corresponding to the assigned network address received in the query, and responding to the query from the another server apparatus with the determined identification information. The server may further add the assigned network address to an upload operation in which print data information and the assigned network address are uploaded to the another server apparatus. The identification information provided in the query may be hotel room key information or credit card information.

In yet a further aspect, the invention provides for Internet printing by hotel guests by a server apparatus receiving, via a network, uploaded print data information and location information, querying another server apparatus corresponding to the location information for identification information corresponding to the location information, receiving the identification information from the another server apparatus in response to the query, storing the received identification information in correspondence with the uploaded print data information, receiving the identification information from a printing device, and in response to the received identification information, transmitting to the printing device the print data information stored in correspondence to the identification information.

In another aspect, the invention provides for hotel guests to print over a network such as the Internet by uploading, via the network, to a printing service provider, print data information, location information and user identification information, determining key information based on the uploaded user identification information, correlating, at the printing service provider, the determined key information with the uploaded print data information, inputting the key information at a printing device connected to the network, transmitting the print data information having the correlated key information to the printing device, and printing the print data information on the printing device. The process may further comprise, after the uploading step, the printing service provider determining a server corresponding to the uploaded location information, querying the determined server corresponding to the location information for the key information based on the uploaded user identification information, the determined server performing the determining step to determine the key information based on the uploaded user identification information, and the determined server transmitting the determining key information to the printing service provider.

In this aspect, the location information may identify a hotel and the user identification information may identify a hotel guest, wherein the user identification information is issued to the hotel guest by the hotel, and the key information may be hotel room key information. Alternatively, the user identification information may also be credit card information.

This latter aspect provides a way for hotel guests that utilize a conventional telephone modem to connect to the Internet to utilize the hotel's Internet printing service. According to this latter aspect, rather than the hotel server detecting that the guest has connected their laptop computer to a network connection in the hotel room and assigning an IP address, the hotel clerk may provide the guest with a user ID at check-in. The guest can then utilize the user ID to upload a print job, which the printing service provider uses to query the hotel server for room key information. The hotel server determines the room key information and provides the same to the printing service provider, whereby, when the guest presents his room key to the hotel's printer, the printing service provider can transmit the print data to the printer for printing.

In yet another aspect, the invention performs Internet printing by hotel guests by uploading, via a network, to a printing service provider, print data information and associated user identification information, inputting the user identification information at a printing device connected to the network, determining whether a user corresponding to the user identification information input in the inputting step is a registered user authorized to print at the printing device, in a case where the determining step determines a positive result, transmitting the print data information having associated user identification information to the printing device, and printing the print data information on the printing device.

In this latter aspect, the hotel guest could merely upload credit card information with the print data to the printing service provider from any location, and need not necessarily perform the upload operation from the hotel room. Then, when the guest wants to print their print job using the hotel's Internet printing service, the guest merely swipes their credit card at the hotel's printer. The printer transmits the credit card information to the printing service provider, which in turn queries the hotel's server to confirm that a guest having the input credit card information is a registered guest at the hotel. If the guest is confirmed as being registered with the hotel, then the print job is printed out on the hotel's printer.

In yet another aspect of the invention, a hotel guest performs Internet printing by print data information and hotel guest information being uploaded to a printing service provider, inputting, at a printing device, the hotel guest information, transmitting the uploaded print data information to the printing device in response to the inputting step, and printing the print data information on the printing device. In this aspect, the uploading step may be performed by a hotel server, wherein the print data information comprises billing information, and the hotel guest information comprises room key information. The hotel server may perform the uploading step in response to a request by a hotel guest for printing of billing information, wherein the request may be made by the hotel guest utilizing a video check-out.

With the aspect, a hotel guest can obtain a printed copy of their final billing statement without having to wait in line at the hotel's front desk, and without having to wait for the hotel to mail a copy of the bill to the guest. The guest merely utilizes the hotel's video check-out system and requests a copy of their billing statement. After completing the video check-out, the guest then merely swipes their hotel room key at one of the hotel's printers, preferably a printer located in the hotel lobby, whereby their final billing statement is printed out.

Another aspect of the invention provides for users to upload documents for printing from one hotel (or other) location and to retrieve them at another hotel. According to this aspect, printing over a network comprises uploading, via the network and from a first location, to a printing service provider, print data information and location information of the first location, a first determining step of determining first identification information of a user based on the uploaded first location information, correlating, at the printing service provider, the determined first identification information with the uploaded print data information, inputting second identification information of the user at a printing device connected to the network at a second location, a second determining step of determining the first identification information of the user corresponding to the input second identification information, transmitting the print data information having the correlated first identification information from the printing service provider to the printing device, and printing the print data information on the printing device. The first determining step may comprise the printing service provider determining a first server corresponding to the uploaded first location information and querying the first server for the first identification information, the first server determining the first identification information corresponding to the first location information, and the first server transmitting the determined first identification information to the printing service provider. The second determining step may comprise the printing service provider determining a second server corresponding to location information of the printing device, the printing service provider querying the second server for the first identification information of the user corresponding to the second identification information, and the second server transmitting the determined second identification information to the printing service provider.

Thus, with this aspect, a user in their hotel room at a first hotel can upload a print job to a printing service provider with the network address of the hotel room port being uploaded with the documents. The printing service provider may then determine a hotel server corresponding to the hotel room port address and query the hotel server for a unique name (username) of the hotel guest registered in the room corresponding to the port address. The hotel server provides the username to the printing service provider, which then stores the username in correspondence with the uploaded documents. Then, the user can retrieve the documents at a printer at a different hotel. To retrieve the documents, the user can merely swipe their hotel room key at a printer. The printer transmits the room key information to the printing service provider. The printing service provider, knowing the identity of the printer that transmitted the room key information, determines a hotel server for a hotel in which the printer is installed and queries the hotel server for a username corresponding to the received room key information. The hotel server determines the username and responds to the printing service provider with the same. The printing service provider can then determine if any print jobs have been uploaded having the corresponding username and if so, then transmits the print data to the printer.

As can readily be seen by the foregoing, a user can easily retrieve their print jobs at virtually any hotel, even though those print jobs may have been uploaded at a different location. Therefore, even greater flexibility in a hotel printing system can be provided.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1:
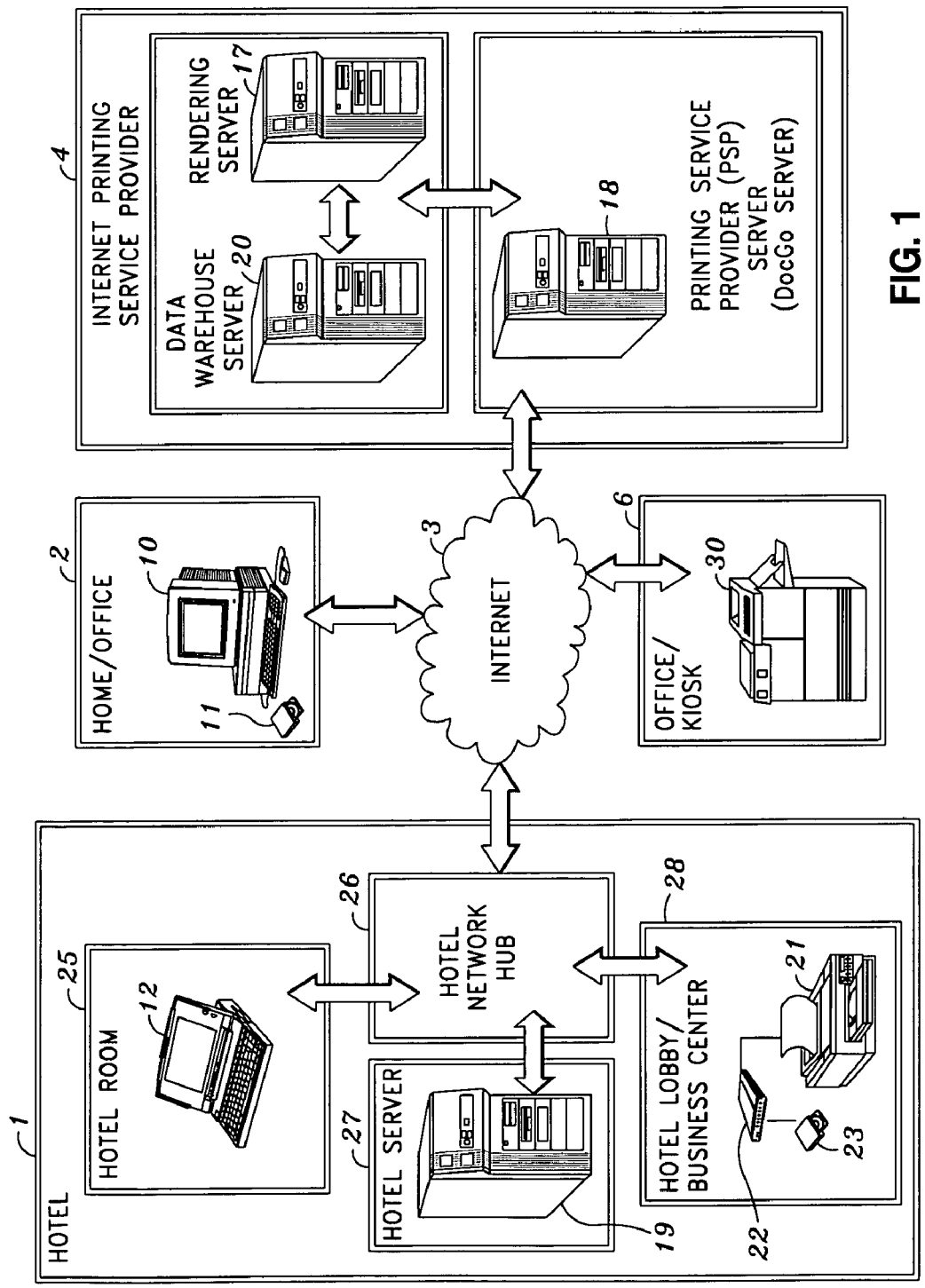
FIG. 1 depicts a network environment in which the invention may be employed.

FIG. 1 depicts one example of a network environment in which the invention may be employed. The network environment depicted in FIG. 1 is preferably the Internet, but is not limited to such and any network environment could be utilized to practice the invention. As seen in FIG. 1, a network infrastructure (such as the Internet) may provide for communication between various entities located at various geographical locations. For instance, a hotel 1, a user's home/office 2, an Internet printing service provider 4, a hotel lobby 28, and an office/kiosk 6 may all be connected to Internet 3, thereby providing for communication between each of the entities regardless of their geographical location. Of course, the entities depicted in FIG. 1 are mere examples of a few entities that may be connected to Internet 3 and numerous other entities could also be included. With the various entities being connected via Internet 3, information can be transferred from one entity to another. For instance, information can be transferred from home/office 2 to Internet printing service provider 4 and then to hotel 1 via Internet 3. Therefore, data such as a print job can be communicated from home/office 2 to Internet printing service provider 4 via Internet 3 and the print job can be retrieved from Internet printing service provider 4 at hotel 1 via Internet 3.

It should be noted that, while the various entities in FIG. 1 are depicted as being located at separate geographical locations, it can be readily understood that at least some of the entities may be included within the same geographical location (i.e., the same building). That is, they may each be a part of a local area network contained within the same building. For example, home/office 2 may be a hotel administration office located with hotel 1, office/kiosk 6 may be a different office or kiosk located within hotel 1, and Internet printing service provider 4 may also be maintained within hotel 1. It can also be readily recognized that numerous other entities may be included as part of the network, such as various other hotels (not shown).

Each of the entities shown in FIG. 1 include various computing equipment which communicate with one another via Internet 3. As seen in FIG. 1, home/office 2 may include a computer workstation 10 that communicates with Internet 3. Computer workstation 10 will be discussed in more detail with reference to FIG. 2, but it is preferably a personal computer (PC) running a windowing operating system. Computer 10 may also be connected to various external devices (not shown) such as printers, scanners, etc. which can be utilized to input and output data.

Computer 10 may also include a magnetic card/key reader 11. Magnetic card/key reader 11 may be a peripheral device such as any known magnetic card reader in which a card such as a credit card is swiped through the device, a smart-card reader that reads smart-cards, or any other type of reading device in which user identification information, credit card information, hotel room key information, etc., can be input. Alternatively, rather than being an external peripheral device, magnetic card/key reader 11 may be integrated with computer 10 such as any known magnetic card/key reader which is incorporated into a keyboard. The use of magnetic card/key reader 11 commensurate with the invention will be discussed in more detail below, but for the time being, suffice to say that magnetic card/key reader 11 may be utilized as one way to for a user to input user identification information or hotel room key information into computer 10.

Figure 2:
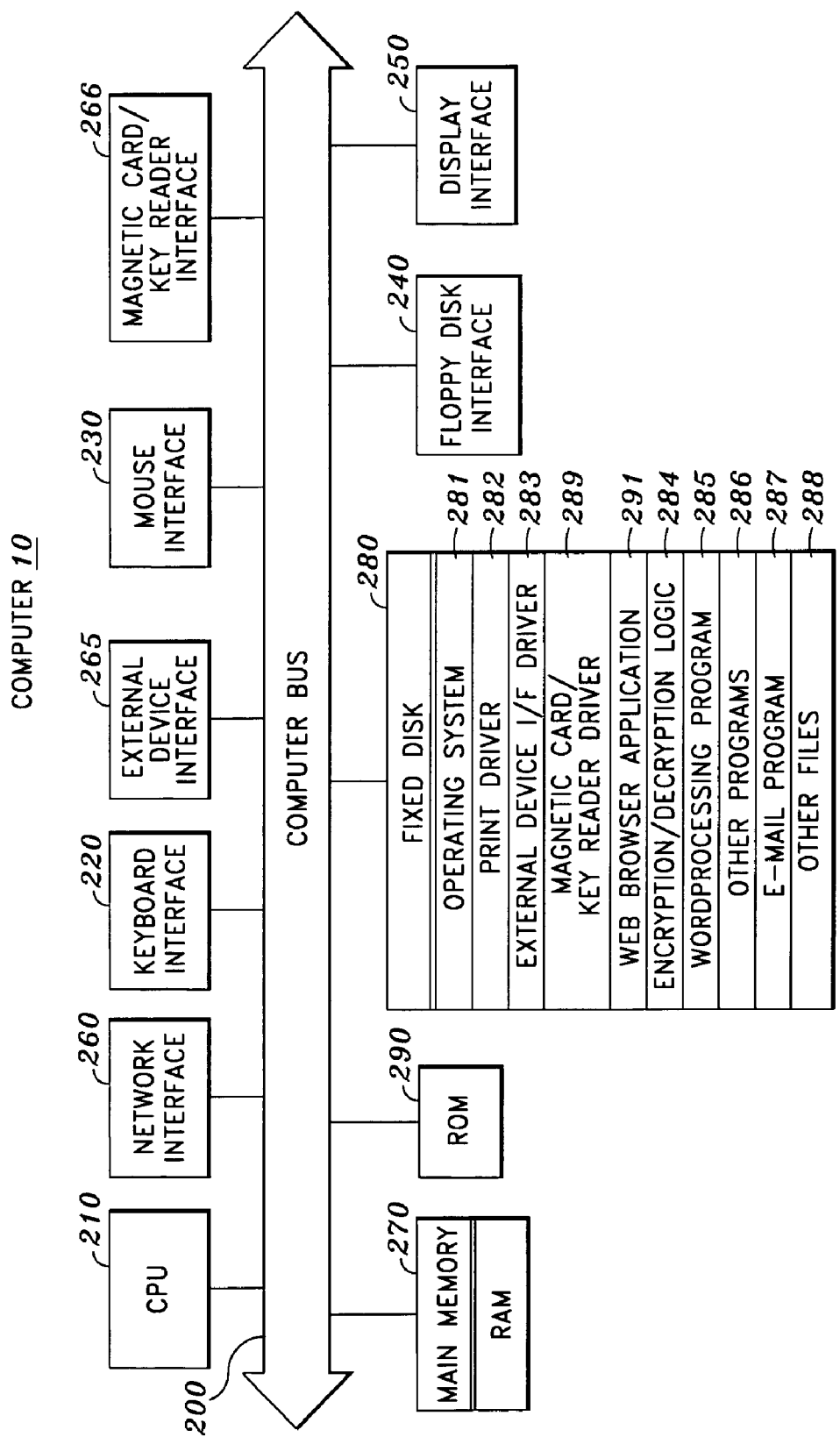
FIG. 2 is a block diagram depicting an internal architecture of a computer used for uploading a print job according to the invention.

Referring to FIG. 2, an example of an internal architecture of computer 10 will now be discussed. A similar architecture may also be included within laptop computer 12. In FIG. 2, computer 10 is seen to include central processing unit (CPU) 210 such as a programmable microprocessor which is interfaced to computer bus 200. Also coupled to computer bus 200 are keyboard interface 220 for interfacing to a keyboard, mouse interface 230 for interfacing to a pointing device, floppy disk interface 240 for interfacing to a floppy disk, display interface 250 for interfacing to a display, network interface 260 for interfacing to Internet 3, external device interface 265 for interfacing to various external devices such as a printer, scanner, etc., and magnetic card/key reader interface 266 for interfacing to magnetic card/key reader 11.

Random access memory (RAM) 270 interfaces to computer bus 200 to provide CPU 210 with access to memory storage, thereby acting as the main run-time memory for CPU 210. In particular, when executing stored program instruction sequences, CPU 210 loads those instruction sequences from fixed disk 280 (or other memory media) into RAM 270 and executes those stored program instruction sequences out of RAM 270. It should also be noted that standard-disk swapping techniques available under windowing operating systems allow segments of memory to be swapped to and from RAM 270 and fixed disk 280. Read-only memory (ROM) 290 stores invariant instruction sequences, such as start-up instruction sequences for CPU 210 or basic input/output operation system (BIOS) sequences for the operation of peripheral devices attached to computer 10.

Fixed disk 280 is one example of a computer-readable medium that stores program instruction sequences executable by CPU 210 so as to constitute operating system 281, print driver 282, external device interface driver 283, encryption/decryption logic 284, word processing program 285, other programs 286, email program 287, other files 288, magnetic card/key reader driver 289 and web browser application 291. Operating system 281 is preferably a windowing operating system, although other types of operating systems may be used with the present invention. Print driver 282 is utilized to prepare image data for printing. Magnetic card/key reader driver 289 is utilized to drive and control magnetic card/key reader interface 266 for interfacing with magnetic card/key reader 11. Encryption/decryption logic 284 may be utilized to perform various encryption or hash algorithms, such as Secure Hash Algorithms (SHA), for encrypting data to be transmitted via Internet 3. Encryption/decryption logic 284 may also be part of Secure Sockets Layer (SSL) for securely transmitting data over Internet 3.

Word processing program 285 may be any typical word processing program for creating documents and images, such as Microsoft Word, or Corel WordPerfect documents. Other programs 286 contains other programs necessary to operate desktop computer 10 and to run desired applications. Email program 287 may be a typical email program such as Microsoft Outlook or Lotus cc:Mail that allows desktop computer 10 to receive and send email messages over network 1. Other files 288 may include any other files necessary for the operation of desktop computer 10 or files created and/or maintained by other application programs on desktop computer 10. Web browser application 291 may be any type of web browser application such as Microsoft Internet Explorer or Netscape Navigator which provides a user interface for accessing the Internet.

Magnetic card/key reader driver 289 and encryption/decryption logic 284 may also operate in conjunction with one another to perform various operations for inputting user information or hotel room key information and transmitting the information via Internet 3. For instance, when a user swipes a magnetic card, such as a credit card or a hotel room key, through magnetic card/key reader 11, magnetic card/key reader driver 289 may read the information and submit it to encryption/decryption logic 284 for an encryption process. Upon receiving the card information, encryption/decryption logic may perform any one of various known encryption or hash algorithms to securely transmit the information over Internet 3. In the preferred embodiment of the invention, the information is transmitted over Internet 3 by computer 10 via an SSL protocol. However, the card information may be hashed instead by a secure hash algorithm with the hash value then being transmitted via Internet 3.

Returning to FIG. 1, hotel 1 may include a local area network (LAN) that includes network connections in each guest room (such as hotel room 25), a hotel server 27, a hotel business center 28, and a hub 26 linking the various components of the network and providing for communication of hotel 1 with Internet 3. It can readily be understood that any common local area network infrastructure may be included within hotel 1. For instance, hub 26, while depicted generally in FIG. 1, may include various devices such as routers, mail servers, print servers, network hubs, etc., which form a local area network. The precise details of the components of hub 26 can vary greatly and any commonly known components can be used to practice the invention. Accordingly, a detailed description of these components will not be provided herein for the sake of brevity.

Hotel lobby/business center 28 may be a room within hotel 1 which includes various computing devices, such as personal computers, printers, facsimile machines, etc. which can be utilized by the hotel's guests. However, for the sake of brevity, only a few of the components which may be included will be described herein. Of course, a separate room (e.g., a business center) need not be provided and each of the foregoing devices may be provided in the lobby of the hotel rather than in a separate room. Hotel lobby/business center 28 preferably includes printer 21 which can print a print job, such as a print job submitted to it via Internet 3. Also depicted in hotel lobby/business center 28 as separate devices are network interface device 22 (hereinafter referred to as "Net Extend Lite" or "NEL") and magnetic card/key reader 23. Although depicted as separate devices, NEL 22 and magnetic card/key reader 23 may be incorporated into printer 21. Magnetic card/key reader 23 may be similar to magnetic card/key reader 11 and any known type of card/key reader could be employed. NEL 22 will be described in more detail below with reference to FIG. 4. Briefly however, NEL 22 provides functionality for the input of room key information, credit card information, etc., from magnetic card/key reader 23, transmission of the room key information (or credit card information) to server 18 in Internet printing service provider 4, receiving print data to be printed from server 18, and submitting the print data, either directly, via a local network, or via Internet 3, to printer 21 for printing. Alternatively, NEL 22 may perform a hash algorithm on the room key information (credit card information) and transmit the hash value to server 18 rather than transmitting the room key information (credit card information) itself.

Hotel room 25 preferably includes a network data connection (not shown) that is part of a local area network within hotel 1. The data connection preferably allows a hotel guest with a laptop computer 12 configured for networking to connect their laptop to the network connection to become a recognized device on the local area network. Accordingly, a user can connect laptop computer 12 to Internet 3 from hotel room 25, thereby allowing the user to communicate with other entities on Internet 3. As such, a user can perform the same operations as described above with regard to home/office 2 and computer 10 such as transmitting user information and data files as part of a print job to Internet printing service provider 4 via Internet 3.

Figure 3:
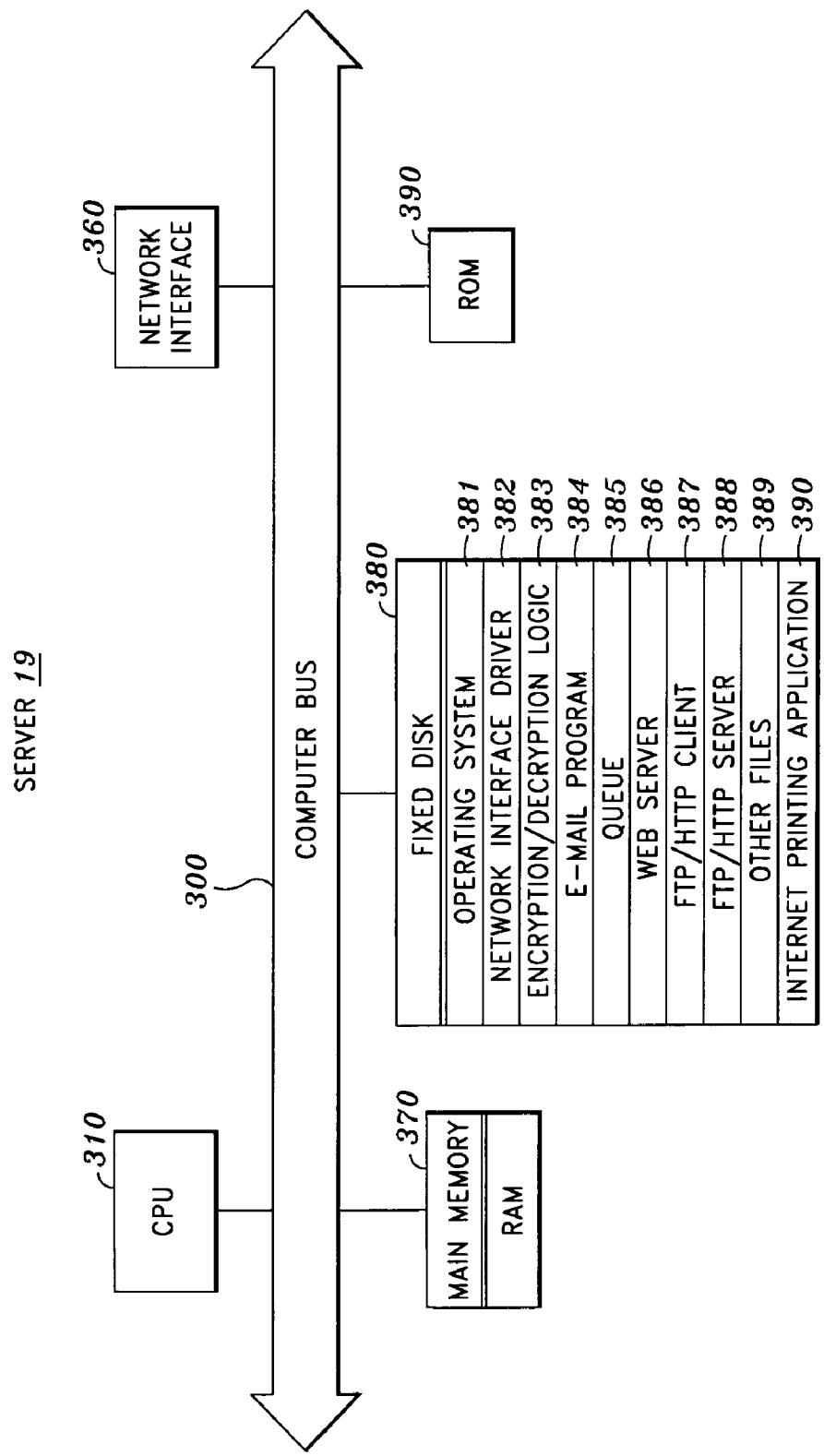
FIG. 3 is a block diagram depicting an internal architecture of a printing service provider server.

Hotel 1 also preferably includes hotel server 19. Hotel server 19 provides functionality for operating the local area network in hotel 1, as well as providing hotel guests with the ability to perform various operations on the local area network and via Internet 3. For example, hotel server 19 may provide functionality for performing various operations related to an Internet printing service according to the invention. An example of an internal architecture of a server, such as hotel server 19, is depicted in FIG. 3. It should be noted that the overall architecture depicted in FIG. 3 is equally applicable to other servers shown in FIG. 1 and is not limited to hotel server 19. For example, the architecture of rendering server 17, data warehouse server 20 and printing service provider server 18 could be similar to that shown in FIG. 3. However, each of servers 17, 18 and 20 may include additional application programs as well as omitting other application programs from those shown in FIG. 3. For simplicity, the following discussion of FIG. 3 will be made with regard to hotel server 19, although it will be equally applicable to all of servers 17, 18 and 20.

In FIG. 3, server 19 is seen to include a central processing unit (CPU) 310 such as a programmable microprocessor which is interfaced to computer bus 300. Also coupled to computer bus 300 is a network interface 360 for interfacing to a network, such as to hub 26 for a local area network in hotel 1, or to Internet 3. In addition, random access memory (RAM) 370, fixed disk 380, and read-only memory (ROM) 390 are also coupled to computer bus 300. RAM 370 interfaces to computer bus 300 to provide CPU 310 with access to memory storage, thereby acting as the main run-time memory for CPU 310. In particular, when executing stored program instruction sequences, CPU 310 loads those instruction sequences from fixed disk 380 (or other memory media) into RAM 370 and executes those stored program instruction sequences out of RAM 370. It should also be recognized that standard disk-swapping techniques allow segments of memory to be swapped to and from RAM 370 and fixed disk 380. ROM 390 stores invariant instruction sequences, such as start-up instruction sequences for CPU 310 or basic input/output operating system (BIOS) sequences for the operation of peripheral devices (not shown) which may be attached to server 19.

Fixed disk 380 is one example of a computer-readable medium that stores program instruction sequences and other files executable by CPU 310 so as to constitute operating system 381, network interface driver 382, encryption/decryption logic 383, e-mail program 384, queue 385, web server 386, FTP/HTTP client 387, FTP/HTTP server 388, other files 389, and Internet Printing Application 390. Operating system 381 can be an operating system such as DOS, Windows 95, Windows 98, Windows NT, UNIX, Novell Netware or any other such operating system. Network interface driver 382 is utilized to drive network interface 360 for interfacing server 19 to hotel network hub 26 for communication on a local area network in hotel 1, as well as to interface with Internet 3. E-mail program 384 is a typical e-mail program and enables server 19 to receive and/or send e-mail messages over a network, such as Internet 3. Queue 385 is utilized to store numerous print jobs that may be submitted to printers within the hotel's local area network, which may be operated via server 19. Other files 389 contains other files or programs necessary to operate server 19 and/or to provide additional functionality to server 19. Web server 386 acts to provide server 19 with functionality as a server on the Internet. As such, web server 386 includes a network address that identifies server 19 on the Internet such that users can access the web server to perform operations such as obtaining information on hotel room rates and availability, and making reservations. FTP/HTTP client 387 provides server 19 with the ability to transmit and retrieve data files via FTP (File Transfer Protocol) and HTTP (Hypertext Transport Protocol) protocols over the network through network interface 360. Additionally, FTP/HTTP server 388 of server 19 can be accessed by an FTP/HTTP client of a printer, a computer workstation such as computer 10 or any other type of device, such as NEL 22.

Encryption/decryption logic 383 may comprise any known encryption or hash algorithm. In one embodiment of the invention, user information or room key information may be subjected to a hash algorithm, such as SHA-1. The hash value may then be transmitted via Internet 3 to other servers on the network, such as PSP server 18.

Internet Printing Application 390 provides functionality for an Internet printing service. More specifically, Internet Printing Application 390 includes a correspondence table that stores, for each hotel guest, information including guest name, credit card number, room number, room key information, username and password, random number, network address of the guest room, etc. As will be described below, any of the foregoing information stored in the table may be utilized in performing Internet printing according to the invention. Internet Printing Application 390 also preferably communicates with other application programs running in server 19, such as a DHCP application. In this regard, the DHCP application recognizes when a new device, such as laptop 12, is connected to the local area network in hotel 1 and provides TCP/IP configuration data for the new device accordingly. The configured IP address is provided to application 390 where it is stored in correspondence with the hotel guest information for later use, as will be described in more detail below. Internet Printing Application 390 also includes functionality for interpreting and responding to queries from PSP server 18, which will also be described in more detail below. Additionally, Internet Printing Application 390 preferably includes functionality for billing the hotel guest, e.g., by connecting to the hotel billing system, to bill for usage of the Internet printing system.

Server 19 also preferably includes firewall software to inhibit access to data on server 19, but which provides for access to web server 386 (if included in server 19). In this regard, any standard firewall software may be utilized and may be included within Other files 389 shown in FIG. 3.

Returning again to FIG. 1, also provided within the local area network of hotel 1 is hotel lobby/business center 28. Depicted in business center 28 of FIG. 1 is a printer 21, a network interface device (NEL) 22, and a magnetic card/key reader 23. Printer 21 is preferably a laser printer with networking capability, but any other type of printer may be utilized instead. NEL 22 and card/key reader 23 are depicted as separate devices connected to printer 21, but may be incorporated within printer 21 instead. NEL 22 and card/key reader 23 provide functionality for a user to swipe a magnetic card or room key through the card/key reader with information contained on the card/key being transferred via Internet 3 to server 18.

Figure 4:
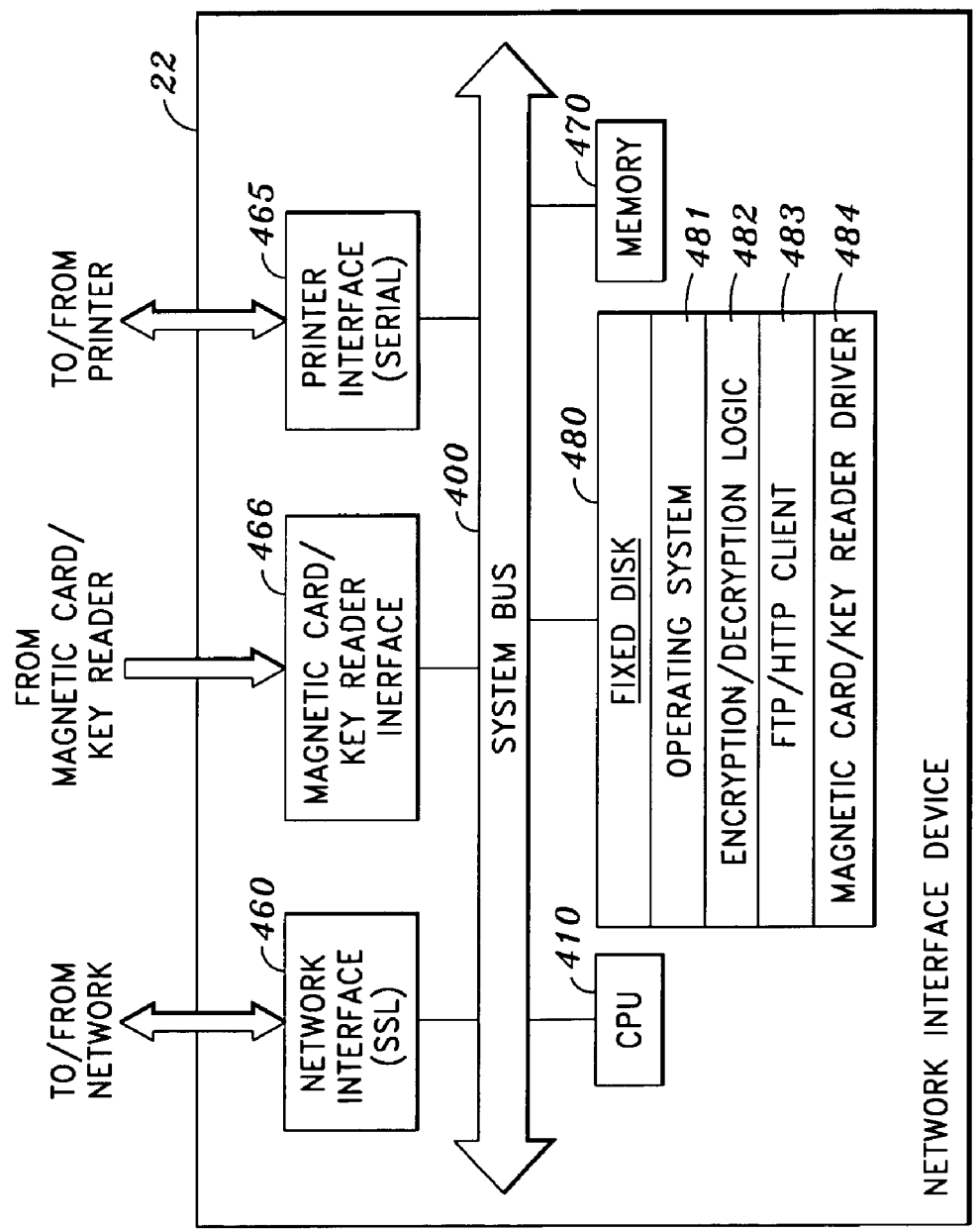
FIG. 4 is a block diagram depicting an internal architecture of a network interface device according to the invention.

FIG. 4 depicts an example of an internal architecture of network interface device (NEL) 22. As seen in FIG. 4, network interface device 22 may include an architecture along the lines of a personal computer. That is, it may include CPU 410, memory 470, network interface 460, magnetic card/key reader interface 466, printer interface 465 and fixed disk 480, all of which are connected to system bus 400. Network interface 460 preferably utilizes Secure Sockets Layer (SSL) protocol for transmitting and receiving information via a network, such as Internet 3. Magnetic card/key reader interface 466 is connected to magnetic card/key reader 23 and is similar to magnetic card/key reader interface 266. Printer interface 465 may be a serial connection, a parallel connection, a USB (Universal Serial Bus) connection, or a network connection (either local or remote) connected to printer 21 for transmitting data to printer 21. For simplicity, FIG. 4 depicts a serial interface directly connected to printer 21.

Fixed disk 480 is preferably a hard disk similar to fixed disk 280, but may be a solid state memory instead, such a flash memory. Fixed disk 480 preferably includes application programs such as operating system 481, encryption/decryption logic 482, FTP/HTTP client 483, and magnetic card/key reader driver 484. Operating system 481 is preferably an embedded operating system, such as VXWorks, but may be any other type of operating system which includes functionality for transmitting information over Internet 3 to server 18 and for receiving print data and submitting it to a printer for printing. Magnetic card/key reader driver 484 and encryption/decryption logic 482 may be similar to those described above with regard to encryption/decryption logic 284 (i.e. SSL, SHA-1, etc.) and magnetic card/key reader driver 289. Network interface device 22 preferably utilizes SSL to securely transmit user information or room key information, and to receive print data, via network interface 460. Alternatively, any known encryption and/or hash algorithm may be used to hash the information with the hash value being transmitted to server 18. FTP/HTTP client 483 receives and transmits print data over Internet 3 via the FTP or HTTP protocols.

A more detailed description of the operation of network interface device (NEL) 22 will be described below, but briefly stated, when a user swipes a magnetic card or a room key through magnetic card/key reader 23 connected to network interface device 22, user information or room key information is read by card/key reader driver 484 and is transmitted via network interface 460 to server 18. Alternatively, the network interface device may hash the user or room key information and transmits the hash value to server 18. Network interface device 22 then receives print data from server 18 which in turn is transmitted to printer 21, either via a local network or through printer interface 465.

The network environment depicted in FIG. 1 also includes office/kiosk 6, which includes a combined copier/printer 30. Copier/printer 30 may be a printing device similar to printer 21 or any other type of printing device, which includes a network interface device and a magnetic card/key reader such as those shown in business center 28. In this regard, for simplicity, a network interface device and credit card reader are not depicted as separate devices in office/kiosk 6, but rather, have been incorporated in copier/printer 30. Office/kiosk 6 may be included within hotel 1, or within a different hotel or another location such as an airport, where a user can retrieve a print job utilizing the Internet printing service according to the invention.

Internet printing service provider 4 is preferably operated by a company that provides an Internet printing service, such as Canon's proposed DocGo network. However, as stated above, a separate Internet printing service provider is not necessarily required and the functionality for an Internet printing service may be included within the functionality of hotel server 19, albeit as an operator licensed by the service provider (Canon). Internet printing service provider (hereinafter referred to as "IPSP") 4 preferably includes functionality for allowing users to upload data files for printing, storing the uploaded data files with information identifying the source (username, network address, hotel room key, etc.) of the uploaded data files, for receiving identification information from any of a number of network interface devices (NEL's) that are part of an Internet printing network, for rendering the data files into a printer definition language, and for submitting the rendered data files to a network interface device for printing by a printer. In providing the foregoing functionality, IPSP 4 is seen to include printing service provider (PSP) server 18, data warehouse server 20 and rendering server 17. Although depicted as separate servers in FIG. 1, the functionality provided for by each of servers 17, 18 and 20 may be included within the same device and need not be separate devices. The functionality of each of servers 17, 18 and 20 will now be described in more detail.

As stated above, the internal architecture of each of servers 17, 18 and 20 may be similar to that shown in FIG. 3 and as described with regard to hotel server 19. As such, a detailed description of the internal architecture will not be repeated here. PSP server 18 preferably provides the basic functionality of a web server. As such, server 18 is identified on the Internet by a network address and can be accessed by users via Internet 3. Internet printing application 390 of server 18 is preferably a web server application in which users can upload data files to be printed. In this regard, a user can access the Internet printing service application by entering a URL (Uniform Resource Locator) for a home page of the application. For example, a user may activate a web browser on computer 10 or laptop 12 and enter a URL in the browser for an Internet printing service provider server, such as http://www.docgo.net. Upon entering the URL, a web page for the entered URL is depicted in the web browser. After having accessed the foregoing web page, the user can perform various operations to upload the print job.

Printing service application 390 on server 18 also preferably includes functionality for communicating with data warehouse server 20 for the transfer of data files and other queries (to be described later). Server 18 also preferably includes functionality for communicating with numerous network interface devices (NEL's) that are part of an Internet printing service provider network for receiving user information or hotel room key information input at an NEL, and for transferring rendered data files to the NEL. In this regard, application 390 may include a database of registered NEL's that are part of the Internet printing network such that the NEL is recognized by the application when it attempts to establish a connection with server 18. The data of the registered NEL may also include information relating to the type of printer that the NEL is connected to, and the identity of the hotel in which it is installed. In this manner, when a user swipes their magnetic card or room key at the printer and the NEL establishes a connection with server 18, the NEL will be identified by its registration number, and the type of printer connected to the NEL will also be identified. As will be described below, the printer type is utilized in rendering the data files into an appropriate printer definition language before the data files are transferred to the NEL for printing by the printer.

In addition, application 390 in server 18 preferably includes functionality for communicating with numerous hotel servers, such as hotel server 19, via Internet 3 to query for, and to receive, information from the hotel servers. For instance, application 390 in server 18 may query hotel server 19 for room key information of a user who uploaded data files for printing, where the data files were uploaded with an IP address assigned to the hotel room of the user by server 19. Alternatively, server 18 may query hotel server 19 for confirmation that guest is registered with the hotel that has a credit card number corresponding to a credit card number received from an NEL.

As stated above, data warehouse server 20 also preferably includes an internal architecture similar to that shown in FIG. 3. However, server 20 preferably omits web server 386 and includes firewall software for inhibiting access to server 20 by unauthorized users. Printing service application 390 in server 20 preferably provides for storage of print data files uploaded to server 18, which are transferred from server 18 to server 20. Application 390 in server 20 preferably provides for storage of the data files in conjunction with a cross-reference table which may include information relating to the user that uploaded the data files, such as a username, room key, credit card number, etc. In addition, application 390 in server 20 provides for communication with server 18 to receive and respond to queries from server 18, and for communicating with rendering server 17 to transfer data files therebetween that are to be processed for printing.

Rendering server 17, as stated above, may also include an internal architecture similar to that shown in FIG. 3. Rendering server 17 preferably includes a print data rendering application (which may be included within other files 389) that performs functions to render the print data files into a printer definition language. In this regard, server 17 preferably receives printer type information from server 20, which is provided to server 20 by server 18 when the NEL establishes communication with server 18. Accordingly, when data files are transferred from data warehouse server 20 to rendering server 17, the printer type is also provided to server 17 and server 17 can identify the printer definition language that the data is to be rendered into.

As an alternative arrangement, rendering server 17 may perform a pre-rendering operation when the data files are first uploaded and stored in server 20. That is, when the data files are first transferred from server 18 to server 20 for storage therein, server 20 may transfer the data files to the rendering server before they are stored. Rendering server 17 may perform a pre-rendering operation that performs a partial rendering of the data files to render that portion of the data files that may be common to all printers that are part of the Internet printing network. The pre-rendered (partially rendered) data files are then transferred back to data warehouse server 20 and stored therein. Then, when printing is initiated by the user swiping their magnetic card or room key at the NEL, the pre-rendered files are again transferred by the rendering server to perform a final rendering of the data files based on the type of printer attached to the NEL. This two-step rendering process provides a way for increasing the efficiency of the Internet printing system by reducing the amount of time needed to render the print data files at print time.

A description will now be made of a hotel guest performing Internet printing according to the invention. Briefly, and with respect to the network environment depicted in FIG. 1, a hotel guest connects laptop 12 to a network connection in hotel room 25. Upon doing so, hotel server 27 detects the connection and performs TCP/IP configuration via DHCP, maps the port in the hotel room, and stores the mapping and IP address in the server. The hotel guest then accesses the website for an Internet printing service running in a web-server of PSP server 18. The hotel guest uploads data files to server 18, which are stored in data warehouse server 20. Hotel server 19 also uploads, together with the data files, either the room key information for the hotel guest, the IP address of the hotel room, the username of the hotel guest, etc. to server 18, which are stored in server 20. PSP server 18 may, depending on the information uploaded by hotel server 19, query hotel server 19 for room key information, whereby hotel server 19 provides the same to server 18. The hotel guest, to retrieve their print job, goes to printer 21 in hotel lobby/business center 28 and swipes their room key. Upon swiping their room key, NEL 22 establishes a connection with server 18 and provides the room key information to server 18. Server 18 then queries data warehouse server 20 for data files matching the input room key information. Data warehouse server 20, if it finds matching data files, transfers the data files to rendering server 17, which renders the data files into an appropriate printer definition language and transfers the rendered data files back to data warehouse server 20, or may transfer the rendered data files directly to server 18. The rendered data files are then transmitted from server 18 to NEL 22, which transmits the rendered data files to the attached printer, where they are printed out. While the foregoing describes the invention in terms of a hotel guest printing out a print job using their room key, the invention is not limited to such and could be employed in various alternate environments instead. However, for simplicity, the description that follows will be limited to the hotel environment.

Before describing an Internet printing process by hotel guests, it should be noted that some precursor procedures are generally performed. In a hotel environment, a hotel guest generally checks-in to the hotel. At check-in time, or perhaps prior to check-in, such as when a prospective hotel guest makes a reservation, guest information is recorded in the hotel's guest registry database. For example, when a prospective guest makes a reservation with a hotel, either on-line (i.e., via the Internet), by telephone or by mail-in registration, the prospective guest is requested to provide particular guest information. Some of the types of requested guest information may include the guest's name that the room will be registered under, the number and names of additional guests for each room, a home and/or business address of the registered guest, a telephone number in which the guest can be contacted, the projected length of the registered guest's stay, and a credit card number to reserve the room. At this time, the guest's information is generally input into the hotel's guest registration database. When the guest checks-in to the hotel, the hotel clerk merely verifies the information contained in the database, or enters the information in the database if it was not previously provided, and can then provide the guest with a key their room.

Many hotels utilize magnetic strip card keys which record the guest's information and room key information on the card. To enter their room, or to utilize other hotel amenities, the guest merely swipes their room key card through a magnetic card reader. It is this particular type of room key for which the following discussion will be focused, but of course, other types of room keys may also be utilized. In addition to providing the hotel guest with a room key, the hotel clerk may also provide the guest with additional information relating to an Internet printing service provided by the hotel. For instance, the clerk may provide the guest with a username and password for which they can utilize the hotel's Internet printing system.

With the hotel guest's information having been entered into the hotel's database, and the guest having checked-in and received a room key, the use of an Internet printing system by the hotel guest will now be described. It should be noted that the process of uploading data files may vary, depending on the type of Internet connection that the hotel guest utilizes. That is, the uploaded process may vary based on whether the guest utilizes any of a variety of high-speed Internet connections, or whether they use a telephone modem connection. In addition, various differences in the uploading process may be employed within each of the foregoing connections.

Figure 5:
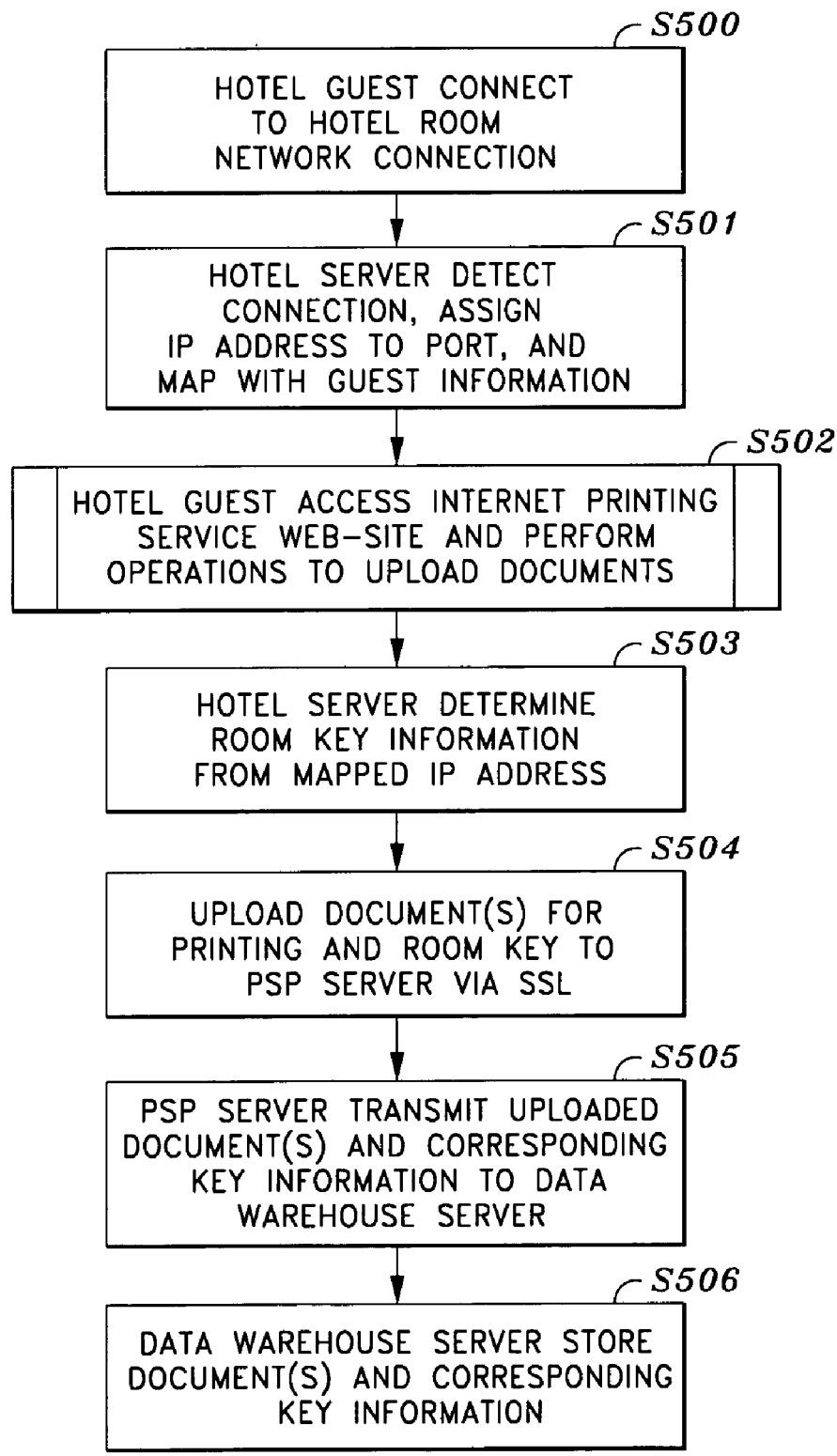
FIG. 5 is a flowchart of process steps for uploading a print job by automatically uploading room key information with a print job.

In one embodiment of the invention depicted in FIG. 5, a fully automated upload process is performed. An fully automated upload process means that the hotel guest's room key information is uploaded together with any data files that the guest selects for printing. In more detail, in the process of the FIG. 5, the hotel guest preferably utilizes a laptop computer that is configured for high-speed Internet access, such as a DSL (Digital Subscriber Link) modem or a digital cable modem, that interfaces with the network via a network interface card. In addition, the hotel guest's laptop network configuration is preferably set for TCP/IP to obtain a network IP address automatically. As such, when the hotel guest connects the laptop network connection to a data port (hotel network data connection) in the hotel room (step S500), upon start-up (boot-up) of the laptop, the laptop's operating system (preferably Windows® 95 or a more recent Windows® version) broadcasts a message to determine whether a server is available for performing automatic IP configuration. The hotel's server, such as server 19, which preferably includes DHCP (Dynamic Host Configuration Protocol) capabilities, detects the broadcast message and performs the dynamic IP configuration in step S501 (i.e., obtains and assigns an IP address to the guest's laptop). Hotel server 19, knowing the data port that the broadcast message was broadcast from, maps the port to the guest's room and inserts the assigned IP address in the hotel's database containing the guest's information.

Figure 9:
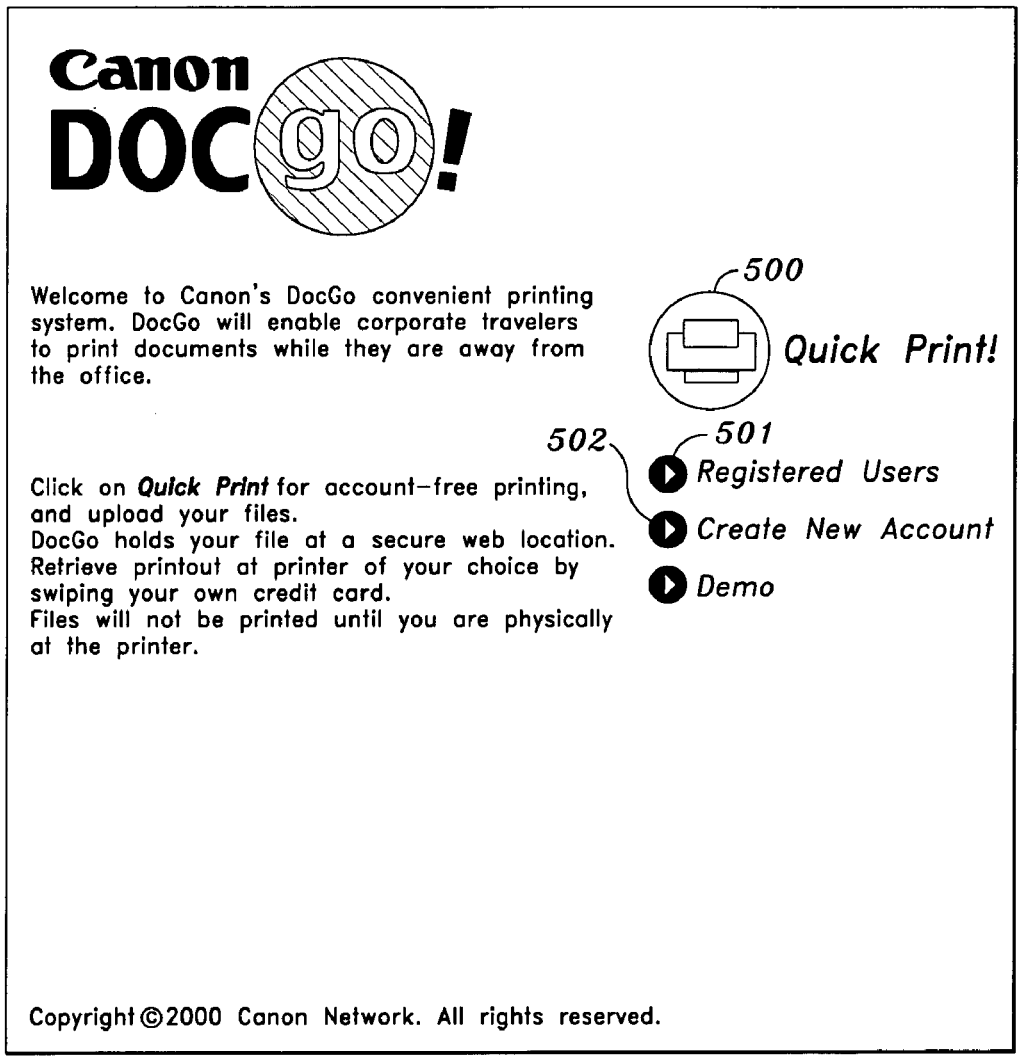
FIG. 9 depicts and example of a home page for a website of an Internet printing service provider.

The hotel guest then activates a web browser application on their laptop and enters a URL (Uniform Resource Locator), or otherwise performs an operation to access a website for an Internet printing service provider, such as www-.DocGo.net. Once the guest accesses the website, a home page is depicted in the web browser, from which the guest can select from any of a number of on-screen display buttons to perform operations to upload data files for printing. An example of a home page for Canon's proposed DocGo network is shown in FIG. 9. Before continuing with the description of steps S503 to S506, the process generally depicted as step S502 in FIG. 5 (i.e., a hotel guest performing a process to upload a file or files for printing) will be described in more detail with regard to FIGS. 9 to 15.

Figure 10:
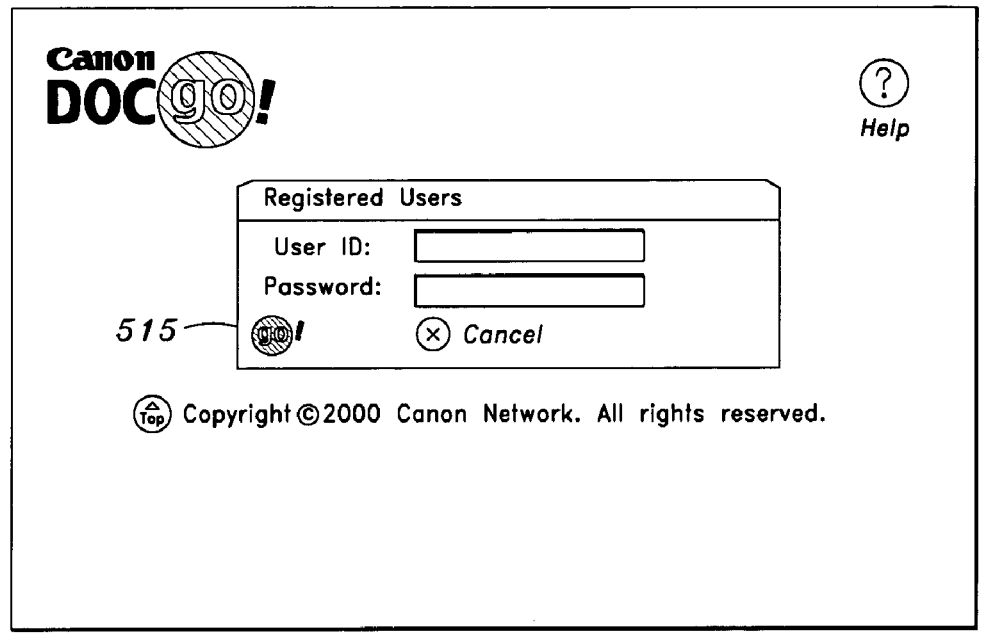
FIG. 10 depicts an example of an interface for a user to login to an Internet printing service.
Figure 11:
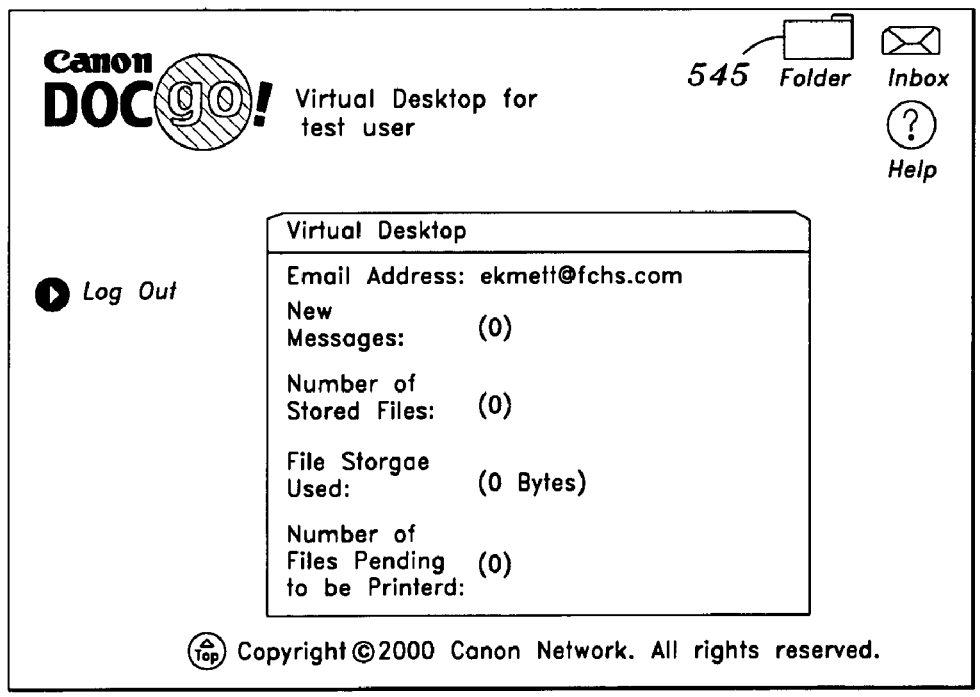
FIG. 11 depicts an example of a virtual folder of a registered user of an Internet printing service.
Figure 12:
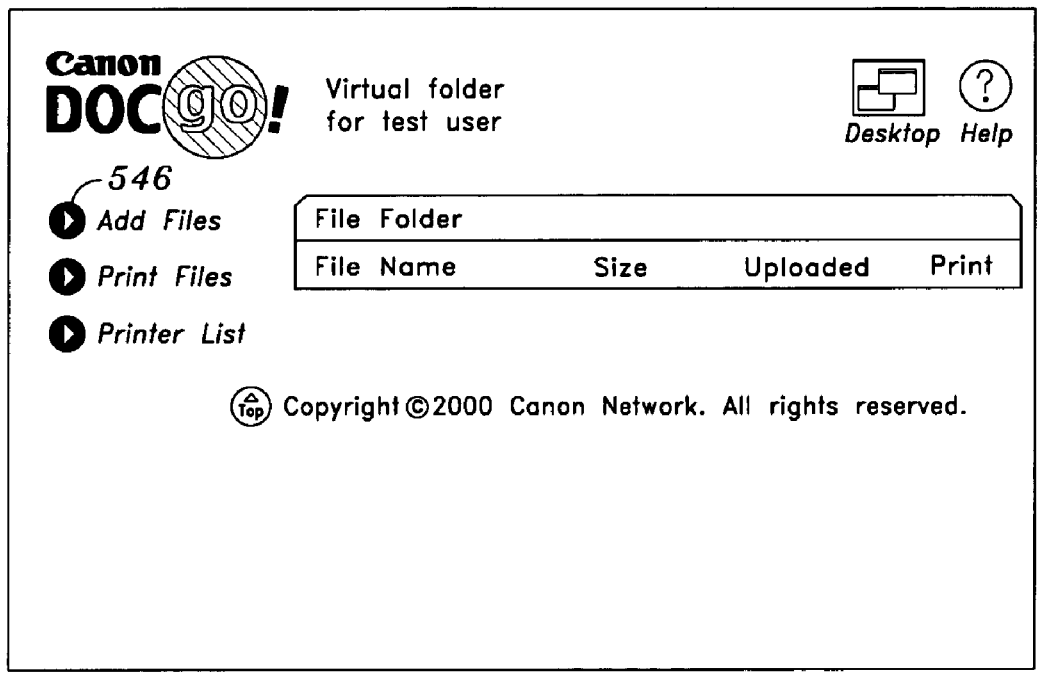
FIG. 12 depicts an example of an interface for a user to add files to be uploaded.
Figure 13:
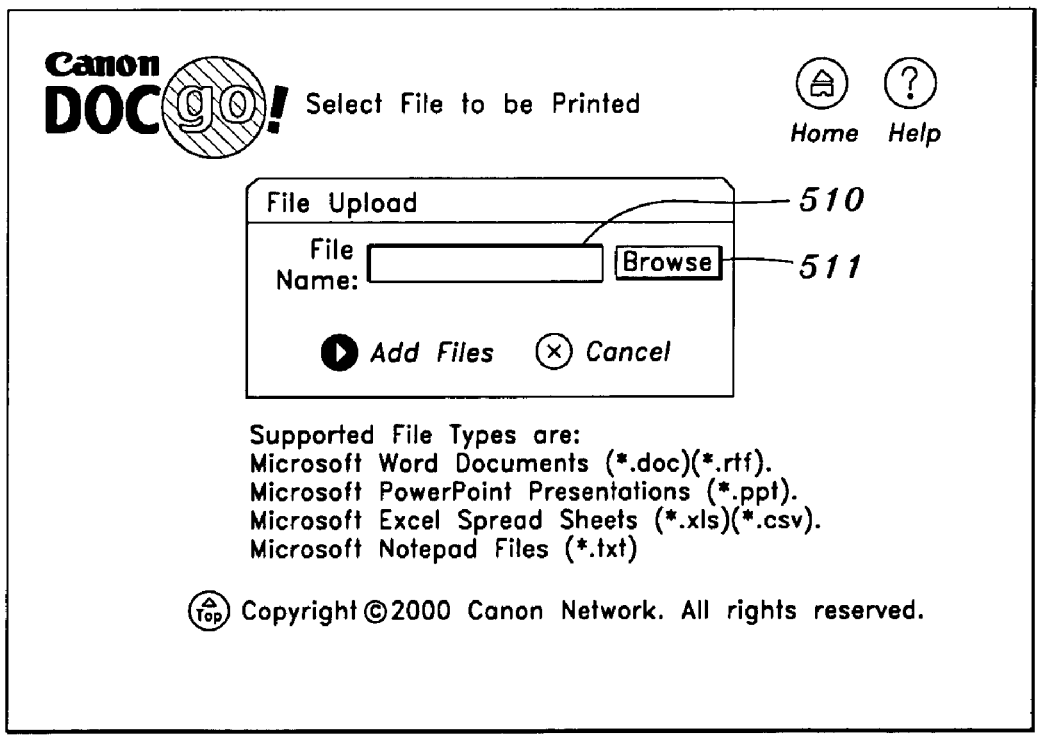
FIG. 13 depicts an example of an interface for a user to input a directory path for a file to be uploaded.
Figure 14:
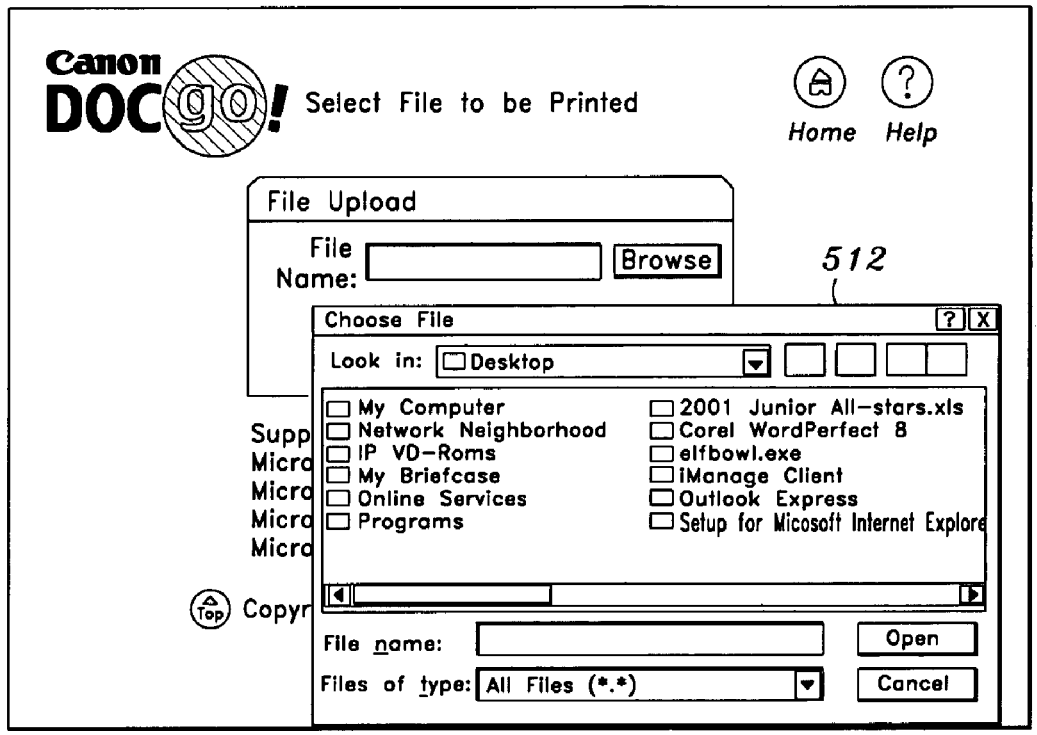
FIG. 14 depicts an example of an interface for a user to browse for a file to be uploaded.
Figure 16:
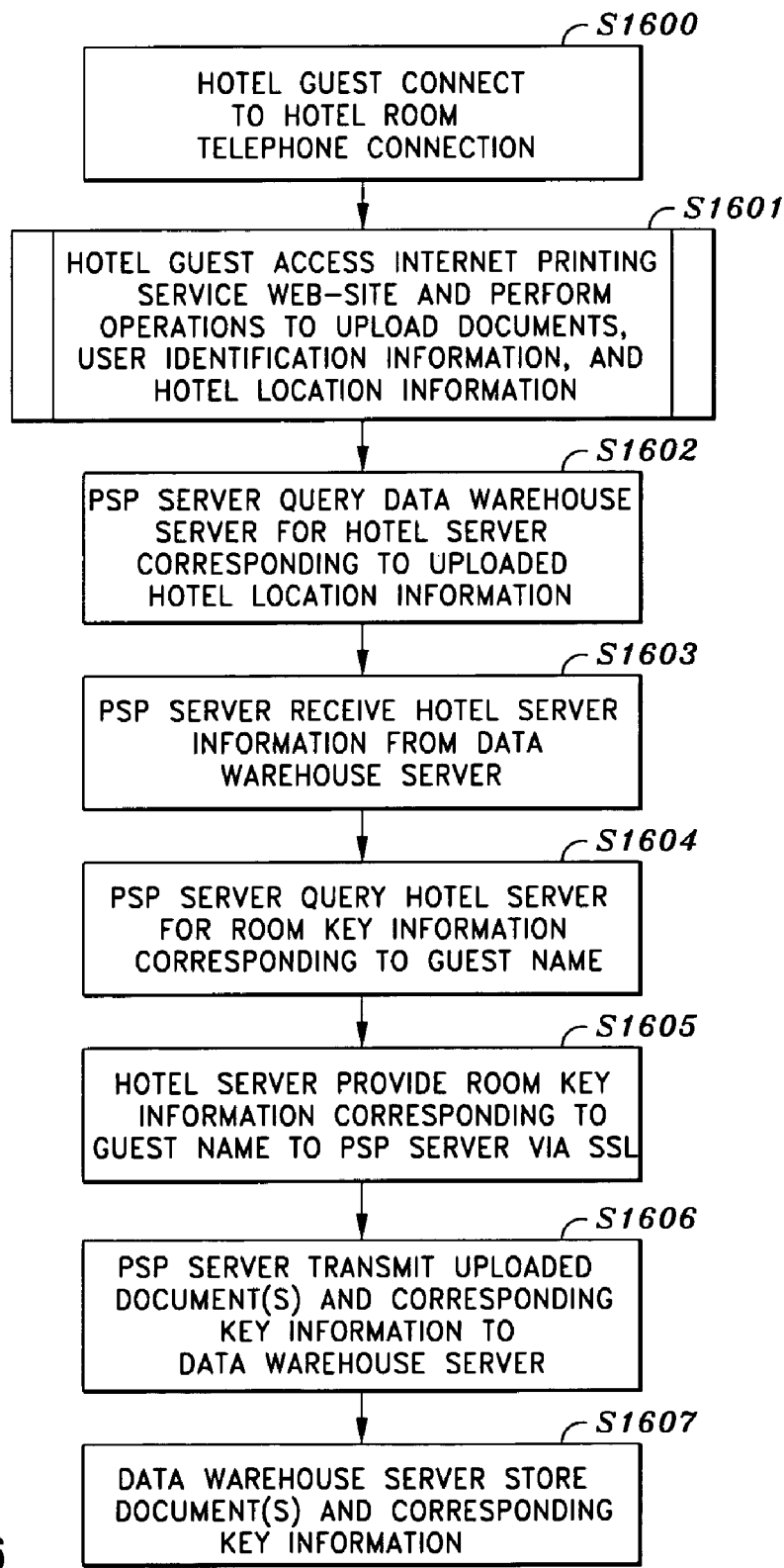
FIG. 16 is a flowchart of process steps for a hotel guest to upload a print job utilizing a conventional telephone modem.

Once the home page shown in FIG. 9 is depicted in the guest's web browser, the guest selects an option to upload a print job. This may comprise the guest selecting a Quick Print option 500 or a Registered Users option 501 as depicted in FIG. 9. In a case where the guest selects Quick Print option 500, a user interface screen such as that shown in FIG. 13 is displayed. In a case where the guest selects Registered Users option 501, a user interface screen such as that shown in FIG. 10 is displayed. In the interface of FIG. 10, the guest enters his/her username and password and selects GO button 515, which presents the virtual folder interface screen shown in FIG. 11. The guest then selects Folder button 545, whereby the user interface screen of FIG. 16 is displayed which lists all print jobs that the guest has uploaded to server 18. To add a new print job, the guest selects Add Files button 546, whereby the user interface screen shown in FIG. 13 is displayed.

Figure 15:
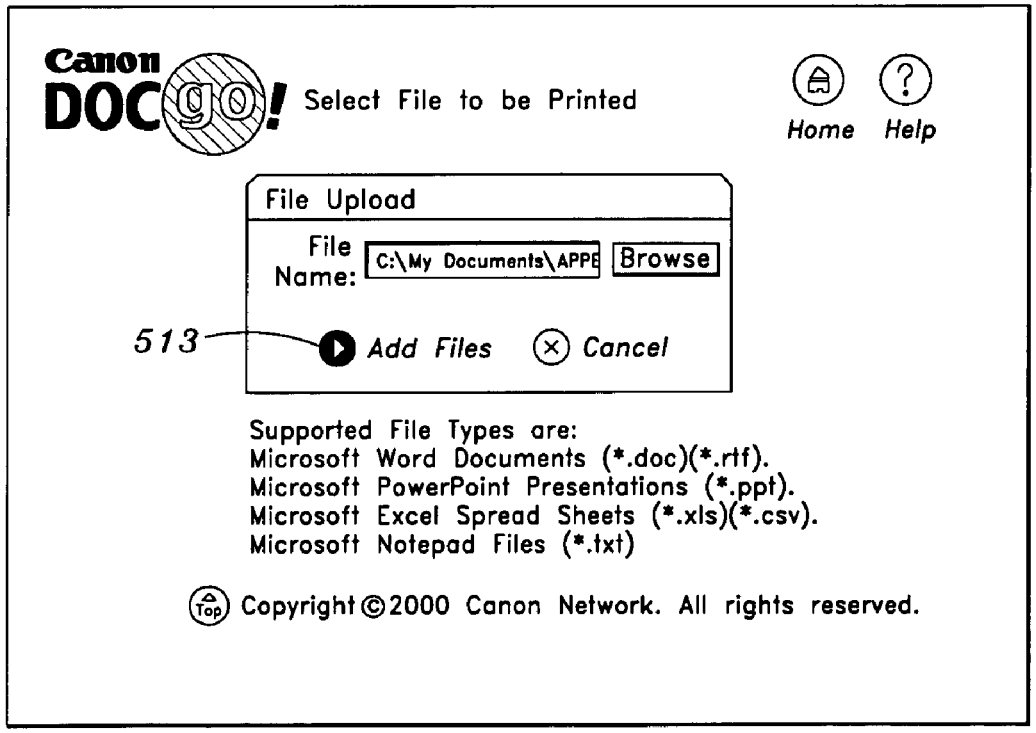
FIG. 15 depicts an example of an interface where a user has entered the directory path for a file to be uploaded.

FIG. 13 is a window for the guest to select a file or files for uploading to server 18 for printing. As shown in the figure, the guest may either enter the directory path for the file (if known) in File Name box 510, or may select Browse button 511 to locate and select the file or files to be uploaded. If the guest selects Browse button 511, a directory explorer window is displayed, such as window 512 shown in FIG. 14. Once the guest either enters the directory path and file name in box 510 or selects a file in window 512, the directory path is depicted in box 510 as seen in FIG. 15. The guest then selects Add Files button 513, whereby the selected file(s) are uploaded to server 18.

Returning to FIG. 5, once the user selects the option to upload the files to server 18, hotel server 19, recognizing the IP address assigned to the guest's room, which identifies the location within hotel 1 where the uploading operation is being performed, queries the hotel's database of registered guests for the room key information corresponding to the IP address (step S503). Hotel server 19 then uploads to server 18 the guest's room key information together with the selected data files (step S504). It should be noted that while room key information is preferably uploaded, other types of information may be uploaded instead, such as a credit card number of the hotel guest, which may be obtained from the hotel server's database. To provide a reasonable amount of security for the room key information and the data files, the uploading process is preferably performed via SSL (Secure Sockets Layer) protocol. However, while SSL is readily recognized as providing ample security for the transmission, SSL is not required and any other means of securely transmitting the data to server 18 could be employed, including performing a secure hash algorithm (such as SHA-1) on the room key information and transmitting the hash value to server 18.

Upon receiving the data files for printing and the guest's room key information, server 18 transmits the received data to data warehouse server 20 (step S505) where it is stored to await initiation of printing (step S506). In this regard, as stated above, data warehouse server 20 preferably includes some type of firewall software that will provide a secure storage for the data files and room key information. Accordingly, while the data files and corresponding room key information are uploaded to web server 18, they are not stored on the web server 18, but instead are securely stored in data warehouse server 20. It should be noted that, as described above, upon first receiving the data files from server 18, server 20 may submit the data files to rendering server 17 for a pre-rendering operation, with the pre-rendered data files then being stored in data warehouse server 20.

As can be seen by the foregoing, an automated upload process is performed whereby the hotel guest's room key information is uploaded by the hotel server in a process that is transparent to the guest. With the data files and room key information having been uploaded to the Internet printing service provider, the uploaded files are ready to be printed by the hotel guest presenting their room key at a printer in the hotel's lobby or in the hotel's business center. This process will now be described with regard to FIG. 6.

Figure 6:
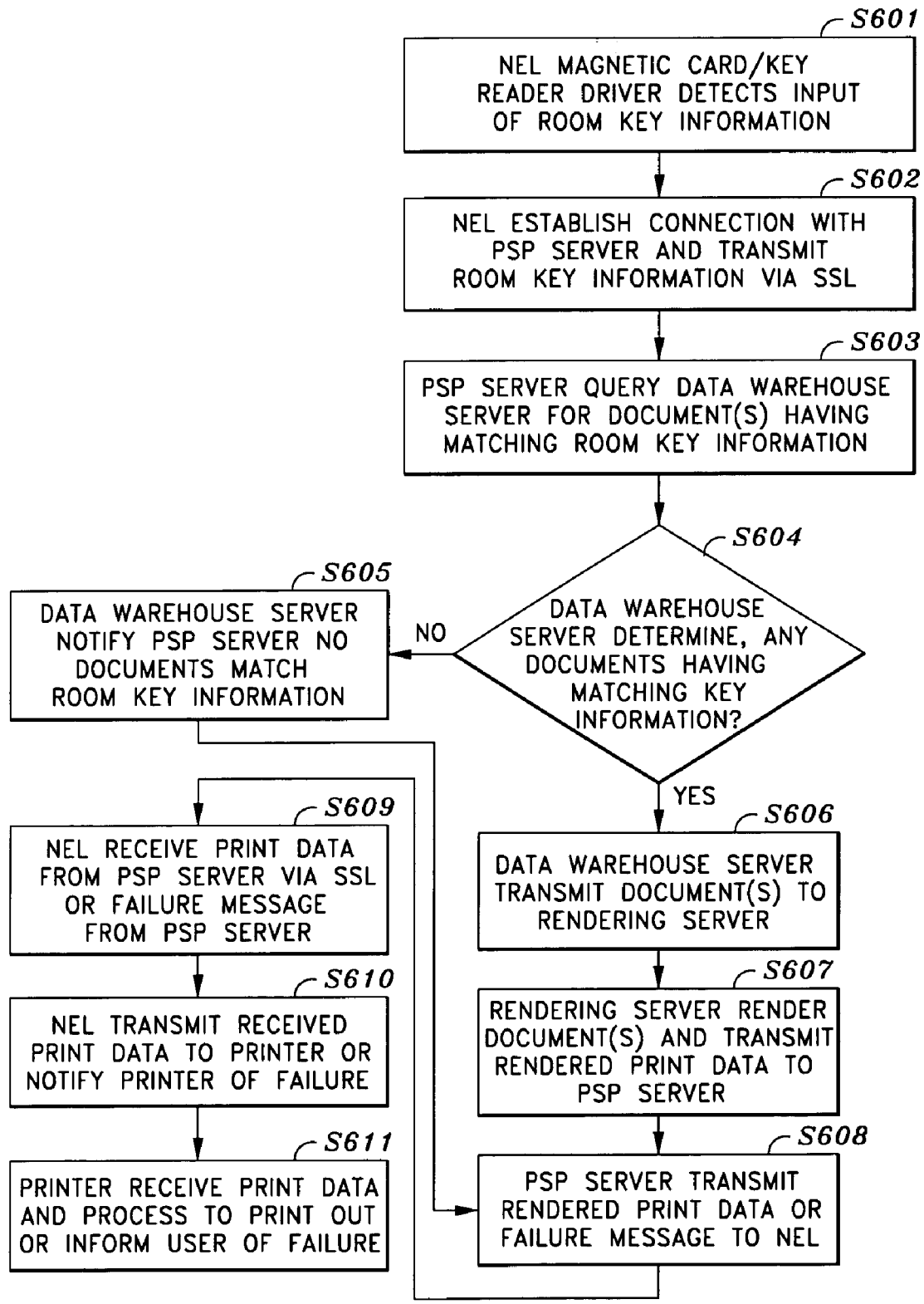
FIG. 6 is a flowchart of process steps for retrieving a print job at a hotel printer according to the invention.

FIG. 6 depicts a flowchart of process steps for a hotel guest to have their uploaded data files printed out on a hotel printer. In step S601, the hotel guest that uploaded files for printing goes to a printer, such as printer 21 in hotel lobby/business center 28 and presents their room key to magnetic card/key reader 23. Again, while a magnetic card room key is utilized in the preferred embodiment, other types of magnetic cards could also be used, such as a credit card. In a case where the room key is a plastic card with a magnetic strip, the guest may swipe their room key card through the magnetic card reader. In a case where the room key is a smart-card type key, the guest may merely press the card against an electronic card reader device. Regardless of the type of room key or magnetic card/key reader used, magnetic card/key reader driver 484 in NEL 22 detects the input of the guest's room key information from magnetic card/key reader interface 466 (step S601). Of course, the type of room key and magnetic card/key reader need to be compatible with one another, otherwise the guest would not be able to input their room key information.

NEL 22, having detected the input of room key information, then establishes a connection with server 18 via network interface 460 (step S602). The connection is preferably made via an SSL connection, but an SSL connection is not necessarily required. While not depicted in FIG. 6, upon receiving a request to establish a connection from NEL 22, server 18 may verify the NEL's identity to confirm that the NEL is registered as part of an Internet printing network. This may constitute server 18 consulting a database of registered hotels and NELs installed therein. In this manner, server 18 is able to determine the identity of the hotel from which the print request is requested (i.e., the identity of the hotel in which the NEL is installed). Once the communication between NEL 22 and server 18 has been established, NEL 22 transmits the guest's room key information to server 18, preferably via SSL over network interface 460 (step S602). Of course, SSL is not required and NEL 22 could perform a secure hash algorithm utilizing encryption/decryption logic 482 on the room key information and transmit the hash value to server 18 instead. However, with this latter technique, server 18 would need to also utilize a secure hash algorithm in order to determine whether any data files corresponding to the hash value have been uploaded.

Upon receiving the room key information and verifying the NEL identity, server 18 queries data warehouse server 20 to determine whether any data files have been uploaded having room key information that matches the room key information received from NEL 22 (step S603). This query preferably includes server 18 transmitting the room key information received from NEL 22 to server 20. The query may also include server 18 transmitting the NEL identity information to server 20, although this process is not necessary and as will be described below, may merely be utilized as an additional feature of the invention. Upon receiving the query from server 18, data warehouse server 20 consults its database of uploaded data files and their corresponding room key information to determine whether any documents have been uploaded that match the room key information received from NEL 22 (step S604). If data warehouse server 20 determines that no data files have been uploaded with matching room key information, it transmits a failure message to server 18 (step S605), which is then transmitted by server 18 to NEL 22 (step S608).

As an additional check within step S604 (not depicted), if server 18 transmits NEL 22's identity information to server 20 together with the room key information, if server 20 determines that data files have been uploaded with room key information that matches the room key information received from NEL 22, server 20 may perform an additional check to determine whether the data files having matching room key information were uploaded from the same hotel from which NEL 22 is installed. In this regard, hotel guests may occasionally lose their room key card and another user, having obtained the card, may swipe the card through an NEL at a different hotel than that which the guest uploaded their documents, where the NEL at the different hotel is recognized as being registered with the Internet printing network. As such, server 18 may confirm the NEL and server 20 may confirm that data files have been uploaded with matching room key information. However, since the room key information was received from an NEL that is installed in a different hotel than that from which the data files were uploaded, server 20 would return a failure message to server 18, which is in turn transmitted to NEL 22. This feature may provide a way for the hotel to control the printout of uploaded data files and accordingly, to prevent a guest or another user from circumventing the billing process for utilization of the Internet printing system.

Returning to step S604, if a determination is made that data files have been uploaded with room key information that matches the room key information received from NEL 22, then server 20 preferably transmits the data files to rendering server 17 (step S606). Server 20 also preferably transmits information identifying the type of printer that is connected to NEL 22, thereby informing rendering server 17 which print driver is to be utilized for rendering the data files. In this regard, when server 18 queries data warehouse server 20, the query may include information pertaining to the type of printer attached to the NEL that the room key information was received from. That is, when server 18 receives the room key information, it may consult its database to obtain printer type information relating to the NEL identity information from which the room key information is received. Server 18 may then pass this information (printer type) on to server 20. Alternatively, server 18 may merely pass on to server 20 the NEL's identity information as described above, whereby server 20 consults its database to obtain the printer information for the printer corresponding to the NEL identity information. Of course, rendering server 17 could also include a database from which it could consult to obtain the printer type information based on the NEL identity information which may be passed from server 20 to server 17. Regardless of how the printer type is identified, rendering server 17 utilizes the appropriate print driver for the printer type connected to NEL 22 and renders the data files for printing (step S607). The rendered data files are then transmitted to server 18, either directly from rendering server 17 or from data warehouse server 20, which receives the rendered data files from server 17, whereby server 18 transmits the rendered data files to NEL 22, preferably via an SSL connection (step S608).

In step S609, NEL 22 receives either the failure message or the rendered data files via network interface 460, which is preferably an SSL connection. NEL 22 then transmits either the failure message or the rendered data files to printer 21 attached to NEL 22 (step S610). This transmission may be either directly to printer 21 via printer interface 465, or via the Internet by way of network interface 460. Printer 21, upon receiving either the failure message or the rendered data files informs the guest of the failure or processes the rendered data files and prints out an image (step S611).

To summarize the foregoing process of FIG. 6, for a hotel guest to retrieve their print job at a hotel printer, the guest merely presents their room key to a reading device at the printer, whereby the room key information is transmitted to server 18. If data files having matching room key information have been uploaded, the data files are rendered and transmitted to the printer for printout. Therefore, the hotel guest can easily upload data files for printing and can retrieve the data files at the hotel's printer merely by presenting their room key.

It should be noted that additional processes for billing the hotel guest for use of the Internet printing service may also be included within FIG. 6 (although not depicted in the figure). For instance, when printer 21 prints out the print job, the printer may inform NEL 22 of information such as the number of pages printed and various finishing options used in printing the print job (such as paper size and type, color versus monochrome printing, one versus two sided printing, etc.). NEL 22, knowing the guest's room key information, may then submit the billing information to hotel server 19, together with the room key information. Accounting software contained within hotel server 19 may then calculate the charge for the printing operation and bill the guest accordingly.

Alternatively, and preferably, when the guest uploads the data files to server 18, server 18 may perform a pre-calculation process to determine the cost of the printing and request that the guest confirm the calculated charge. Then, when printing is initiated at NEL 22 by the hotel guest, server 18 informs hotel server 19 of the charge for the printing, whereby server 19 can add the charge to the guest's bill. The charge may then be shared between the hotel and the Internet printing service provider as part of a shared revenue agreement. Of course, other methods of billing the hotel guest for use of the Internet printing service could be employed and the invention is not limited to any of the foregoing.

Figure 7:
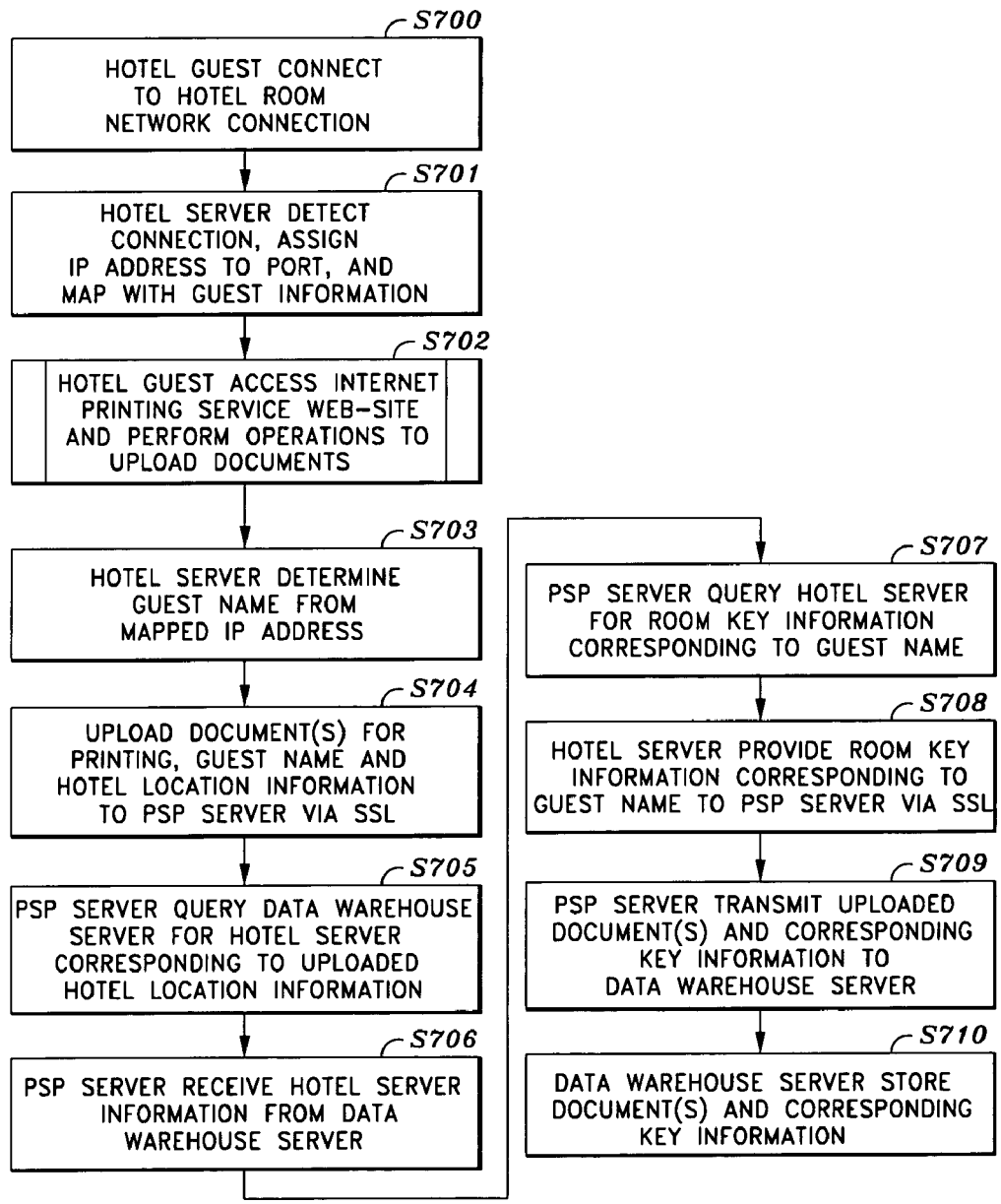
FIG. 7 is a flowchart of process steps for uploading a print job by uploading a username and querying for room key information.
Figure 8:
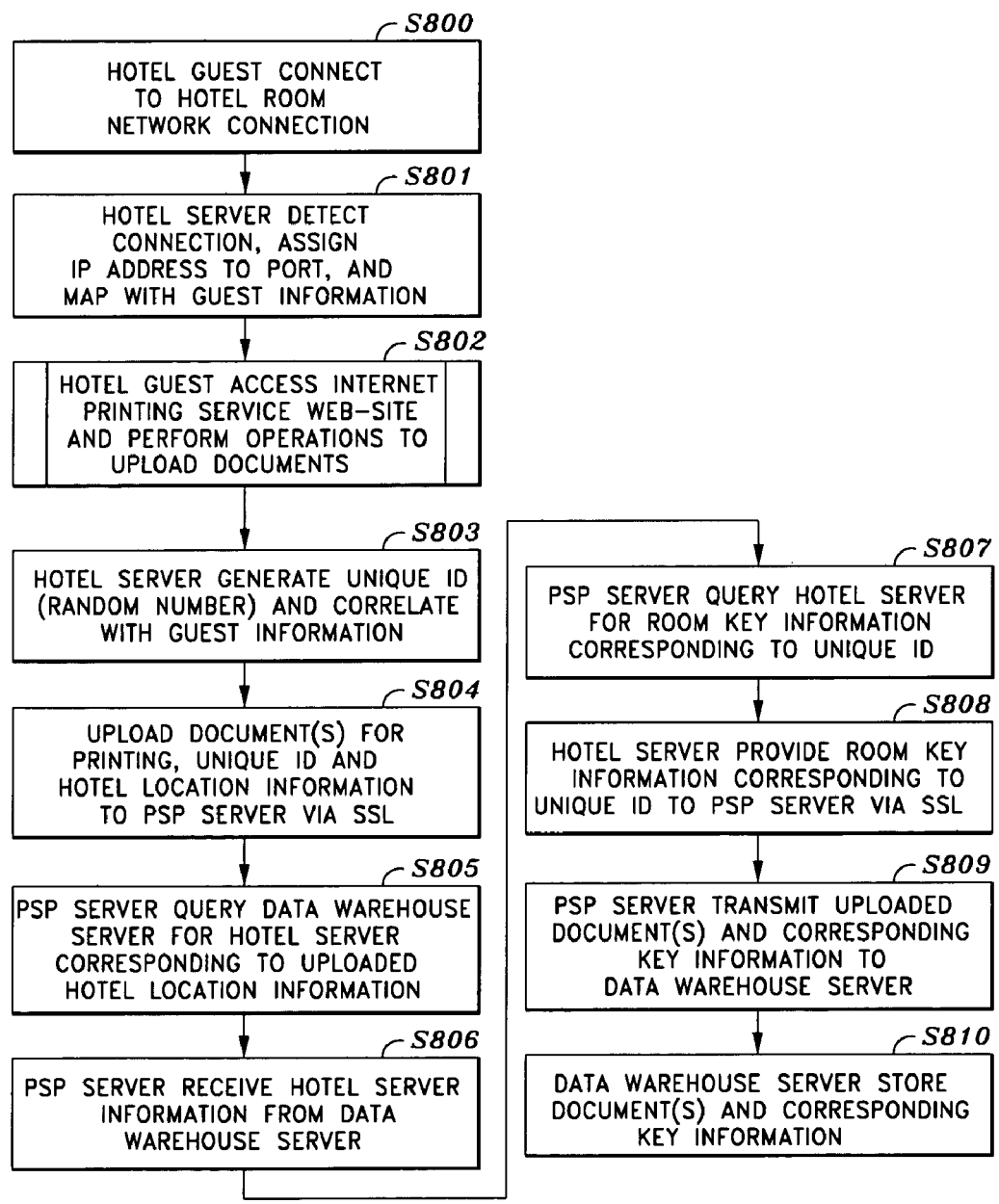
FIG. 8 is a flowchart of process steps for uploading a print job by uploading a unique ID and querying for room key information.

The foregoing embodiment of the invention performed uploading of the data files by the hotel server automatically uploading the hotel guest's room key information together with the data files. However, some hotel's and their guests may want additional security in the upload process so that, in the event that the upload process is compromised, a user intercepting the transmission will not be able to obtain both the data files and the room key information with the same intercept process. As such, one way to provide additional security may be to upload the data files and the room key information in separate upload processes (i.e., at different timings). FIGS. 7 and 8 depict process steps which provide the foregoing by uploading data files and additional information (such as the guest name, a random number, etc. but not the guest's room key information) to an Internet printing service provider server, whereby the Internet printing service provider server queries the hotel server for the hotel from which the data files were uploaded for the room key information that corresponds to the additional information uploaded with the data files. It should be noted that, as described above with regard to FIG. 5, the precursor steps of the hotel guest registering with the hotel and checking-in to the hotel are also performed as a precursor to the processes of FIGS. 7 and 8.

Referring now to FIG. 7, steps S700 to S702 are the same as steps S500 to S502 of FIG. 5. Namely, in step S700, the hotel guest connects their laptop computer to a network connection in their hotel room. Like FIG. 5, the process of FIG. 7 is designed for those guest's that have a laptop computer that with a high speed Internet connection capability and which have TCP/IP networking set to obtain an IP address automatically. In step S701, the hotel server detects the connection, assigns an IP address to the hotel guest's room port and maps the IP address in the hotel server's database with the guest's information. Then, in step S702, the hotel guest accesses an Internet printing service website and performs a process to upload data files for printing. It is at the next step (step S703) however, that the process steps of FIG. 7 depart from those performed with regard to FIG. 5.

In step S703, when the hotel guest begins to upload the data files to server 18, hotel server 19 detects the beginning of the upload process and queries the registered guest database in server 19 for the guest's name that corresponds to the mapped IP address. Hotel server 19 then adds the guest's name information and hotel location information (i.e., information identifying the hotel such as the hotel's name and address, or information identifying the hotel server such as an IP address of the hotel server) to the upload operation (step S704). Like step S504, the upload process is preferably performed via SSL, but again, a secure hash algorithm may be utilized instead. The uploaded information is received by server 18 and steps S705 and S706 depend on whether or not the hotel server's IP address was uploaded in step S704. If hotel server 19 uploads the hotel's name and address information in step S704 rather than the hotel server's IP address, then in step S705, PSP server 18 queries data warehouse server 20 for the hotel server's IP address. Data warehouse server 20 preferably includes a database of hotels that have registered as part of the Internet printing network, where the database cross-references a hotel's name and address with a network address (preferably an IP address) of the hotel's server. Of course, TCP/IP is only one way of identifying hotel server 19 and any other type of identification could also be utilized. Data warehouse server 20, upon determining the hotel server's network address information transmits the same to PSP server 18 (step S706). It should be readily apparent that if hotel server 19 adds the hotel server's IP address to the upload operation, then steps S705 and S706 are not needed and can therefore be omitted.

In step S707, whether hotel server 19 uploads the hotel server's IP address or whether server 18 queries data warehouse server 20 for the hotel server's IP address, server 18 then queries hotel server 19 for the guest's room key information for the guest identified by the uploaded guest name. Upon receiving the query from server 18, hotel server 19 queries its registered guest database to obtain the room key information for the corresponding guest name and uploads the room key information to server 18 via SSL (step S708). Then, steps S709 and S710 are the same as steps S505 and S506 in which the uploaded documents and room key information are transmitted by server 18 to data warehouse server 20 where they are stored awaiting initiation of a printing operation.

Thus, as can be seen by the foregoing, the data files for the documents to be printed are uploaded to the Internet printing service provider server separately from the room key information, thereby providing additional security for the upload process by denying a potential hacker one of either the data files or the room key information.

FIG. 8 is a process along the lines of FIG. 7, but provides even further security by uploading a random number (i.e., a unique identification number which identifies the hotel guest uploading the data files) rather than uploading the guest's name. In FIG. 8, steps S800 to S802 are the same as steps S700 to S702 and therefore, the description of these steps will not be repeated here. However, in step S803, when the hotel guest begins the upload operation, hotel server 19 detects the upload operation and performs a process to generate unique identification information to identify the hotel guest. This process may comprise the hotel server generating a random number that forms a unique identification of the hotel guest. The unique identification information (random number) is stored in the hotel's registered guest database with the guest's information. Then, hotel server 19 adds the guest's unique identification information (random number) to the upload process to upload the random number and either hotel location information or the hotel server's IP address to server 18 (step S804).

Upon receiving the data files, the unique identification information (random number), and either the hotel's location information or the hotel server's IP address, steps S805 and S806 are the same as steps S705 and S706. Namely, server 18 may query data warehouse server 20 for the hotel server's IP address, if necessary. Once having obtained the hotel server's IP address, either by querying server 20 or by the upload process from server 19, PSP server 18 queries hotel server 19 for the room key information corresponding to the unique identification information (random number) (step S807). Steps S808 to S810 are similar to steps S708 to S710 and therefore a description of these steps will not be repeated here.

As can readily be seen by the process of FIG. 8, additional security features could be implemented to prevent a hacker from obtaining the hotel guest's name by implementing a unique identification (random number) process.

The foregoing upload processes of FIGS. 5, 7 and 8 are particular for a case where the hotel guest has a laptop computer with a high-speed Internet connection and networking capability. However, some users may utilize a conventional telephone modem (e.g., a 56 K modem) to access the Internet and may not have their laptop configured for networking. As such, an alternate process for these users to be able to utilize an Internet printing service is also provided by the invention. More specifically, FIG. 16 is a flowchart of process steps for a hotel guest to upload data files utilizing a conventional telephone modem rather than connecting to a local hotel network connection in their guest room.

It should be noted that, as stated above with regard to the process of FIGS. 5, 7 and 8, some precursor steps are performed prior to the hotel guest performing an upload operation. In particular, like the foregoing processes, in the present process the hotel guest registers with the hotel and checks-in upon arrival at the hotel. At check-in time, the guest is provided with a magnetic card room key and the guest's room key information is stored in the hotel server's database of registered guests. In addition, the guest is provided with an Internet printing service username, which may be printed on the guest's room key, or may be provided to the guest on a separate paper at check-in time or left in the guest's room. Alternatively, if the guest has an established account with an Internet printing service (i.e., is a registered user of a service and already has a username), the guest may simply supply the hotel clerk with their username which can then be added to the hotel's database. Further, the user may be provided with information about the hotel that they may need for uploading print jobs to the Internet printing service, such as the hotel's name, address, etc. Thus, having obtained the necessary information for uploading a print job, the guest can perform the upload process at their leisure.

As seen in FIG. 16, in step S1600 the hotel guest connects their laptop computer to a telephone jack in their guest room. Then, in step S1601, the guest performs a process to upload a print job, which may be similar to that described above with regard to FIGS. 9 to 15. That is, the guest may access a home-page for the Internet printing service provider and perform operations to upload the print job. However, unlike the automated processes of FIGS. 5, 7 and 8, the guest manually enters their username and the hotel information during the upload process (step S1601).

Once the user selects the option to upload the print job, PSP server 18 receives the uploaded information, including the guest's username and the hotel information. Similar to the description provided above, server 18 queries data warehouse server 20 for the hotel server's IP address that corresponds to the uploaded hotel information (step S1602). Upon receiving the hotel server's IP address (step S1603), server 18 queries hotel server 19 for the room key information corresponding to the uploaded username (step S1604). Hotel server 19 queries its database and provides the room key information to server 18 in the same manner as described above (step S1605). Server 18 in turn transmits the room key information to data warehouse server 20 (step S1606), which stores the information in correspondence with the uploaded data files (step S1607). To retrieve the print job, the process steps of FIG. 6 are performed.

Thus, as can readily be seen by the foregoing, a user can upload a print job utilizing a telephone modem connection similar to the automated process performed as described above, with one difference being the manual input of the guest's username and the hotel information rather than automated uploading of this information.

Of course, an alternative embodiment along the lines of FIG. 16 could be employed where the guest is not provided with a username by the hotel clerk, but rather, in step S1601 the guest inputs information such as their given name, the hotel's name and address, and their room number. In this alternative process, server 18, upon receiving the information during the upload process, queries data warehouse server 20 for the hotel server's IP address and in turn queries hotel server 19 for the room key information corresponding to the uploaded guest name and room number. Of course, the remaining steps of FIG. 16 would apply equally to this embodiment as well.

In yet a further embodiment of the invention that provides for a hotel guest to utilize an Internet printing service, the guest may upload and retrieve a print job using a credit card rather than their room key. To summarize this process, a hotel guest uploads data files and credit card information to the Internet printing service provider (PSP) server. To retrieve their print job, the guest swipes their credit card at the NEL attached to the hotel's printer, whereby the credit card information and identity information of the NEL is transmitted to the PSP server. The PSP server looks up the hotel server corresponding to the NEL identity and then queries the hotel server to determine if a guest is registered with the hotel that has the corresponding credit card information. If so, then the data files are processed and transmitted to the NEL and in turn to the attached printer where they are printed out.

This embodiment provides hotel guests with somewhat greater flexibility in retrieving their print jobs as compared with the previous embodiments. More specifically, with the present embodiment, the guest can upload their print job from any location and need not necessarily upload the print job from a hotel room. However, the guest can still take advantage of a hotel's Internet printing service merely by swiping their credit card, with the system confirming that the guest having the corresponding credit card information is registered at the hotel. A more detailed description of the present embodiment will now be provided with regard to FIG. 17.

Figure 17A:
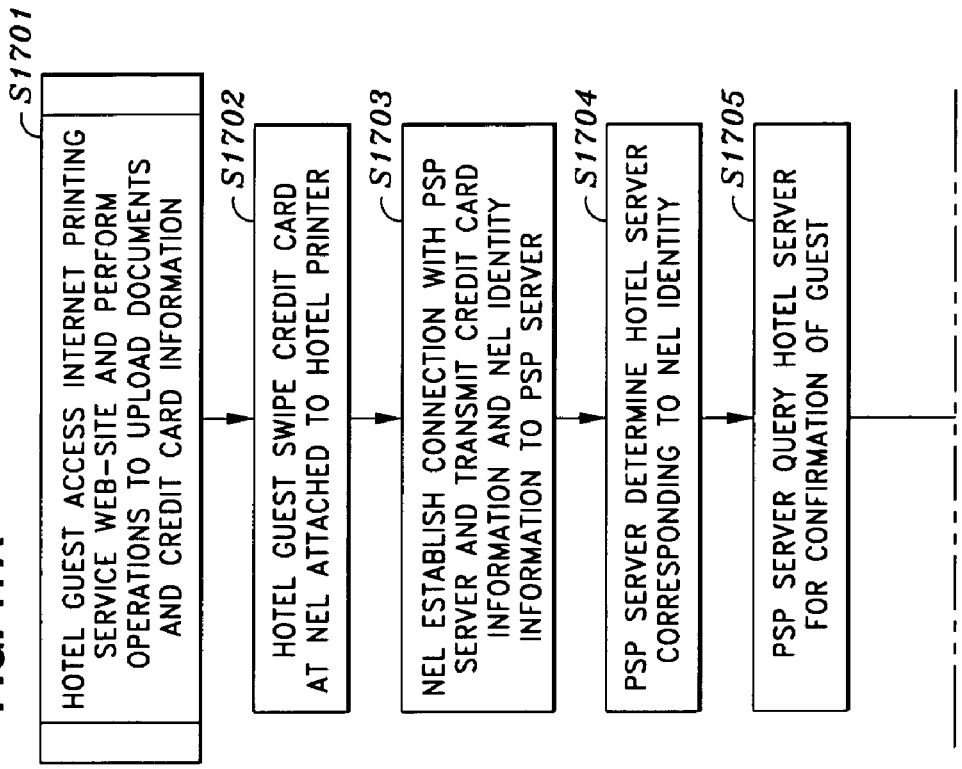
FIG. 17 is a flowchart of process steps for a hotel guest to upload and retrieve a print job via a hotel's Internet printing service utilizing a credit card.
Figure 17:
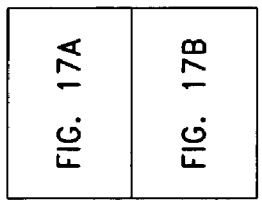
Figure 17B:
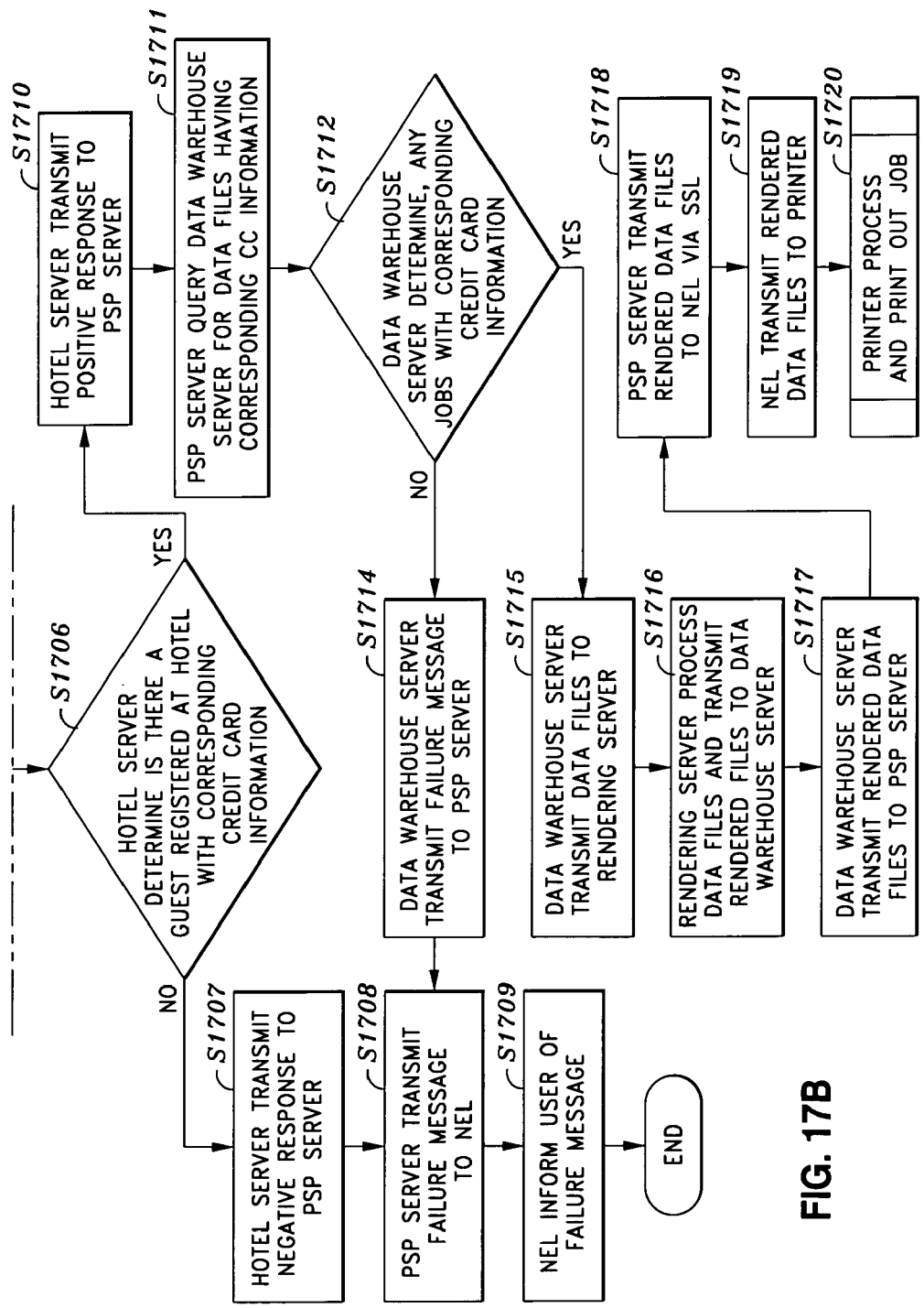

In FIG. 17, a hotel guest performs a process to upload data files and credit card information to server 18 (step S1701). This process may be similar to that described above where the guest connects their laptop to a telephone connection in their hotel room and accesses a Internet printing service website. However, with the present embodiment, the guest need not perform the upload operation from their hotel room, but may perform the upload process from any location. For example, a business traveler may perform the upload process from their office in New York prior to traveling to Los Angeles, where they will be staying at a hotel. The upload process in the present embodiment also includes a step for the guest to input their credit card information (such as the credit card number). The guest's credit card number is uploaded to server 18, preferably via SSL, together with the data files, whereby both the credit card information and the data files are transmitted to and stored in data warehouse server 20. It should be noted that, in inputting the credit card information, the guest may merely be requested to enter the credit card number and not the expiration date. As a result, if the credit card number were to be intercepted during the upload process, the intercepted number would not be able to be utilized since the expiration date is missing.

To retrieve their print job, such as the foregoing business traveler, the guest checks-in to their hotel, whereby their credit card information is recorded in a database of registered guests in the hotel's server, such as server 19. After registering and checking-in to the hotel, the guest swipes their credit card at the hotel's printer, such as NEL 22 and printer 21 (step S1702). Upon swiping their credit card, magnetic card/key reader driver 484 detects the input of the credit card information from magnetic card/key reader interface 466. NEL 22 then establishes a connection with server 18 via network interface 460 and transmits the credit card information and NEL identity information (such as a serial number of the NEL) to server 18, preferably via SSL (step S1703). Server 18, upon receiving the NEL identity information, queries a database of hotel servers and corresponding NEL's installed in the hotel so as to determine the IP address of the hotel server for the hotel corresponding to the NEL (step S1704). Having determined the hotel server's IP address, server 18 then queries the hotel server to determine whether a guest is registered with the hotel that has credit card information corresponding to the credit card information received from the NEL (step S1705). If hotel server 19 determines that a guest having the corresponding credit card information is not registered with the hotel, then flow proceeds to step S1707. If hotel server 19 determines that a guest having the corresponding credit card information is registered with the hotel, flow proceeds to step S1710.

Proceeding first with step S1707, in a case where hotel server 19 determines that a guest having the corresponding credit card information is not registered with the hotel, then hotel server 19 transmits a negative response to server 18. Server 18, after receiving the negative response, transmits a failure message to the NEL (step S1708), which in turn informs the user of the failure (step S1709) and the process ends.

If however, server 19 determines that a guest is registered with the hotel that has the corresponding credit card information, then server 19 replies to server 18 with a positive response (step S1710). Upon receiving the positive response, server 18 queries data warehouse server 20 to determine whether any print jobs have been uploaded with the corresponding credit card information (step S1711). Data warehouse server 20 queries its database (step S1712), and if no print jobs have been uploaded, server 20 transmits a failure message to server 18 (step S1714), whereby server 18 transmits the failure message to the NEL (step S1708) and the NEL informs the user of the failure (step S1709). If however, data warehouse server 20 determines that print jobs have been uploaded with the corresponding credit card information, data warehouse server 20 transmits the data files to rendering server 17 (step S1715), whereby the data files are rendered for printing and transmitted back to data warehouse server 20 (step S1716). The rendered data files are then transmitted from data warehouse server 20 to server 18 (step S1717), and then from server 18 to NEL 22, preferably via SSL (step S1718). NEL 22 transmits the rendered data files to printer 21, either via printer interface 465 or via network interface 460 (step S1719), where the data files are processed by printer 21 and are printed out (step S1720).

Another embodiment of the invention will be described with regard to FIGS. 18 to 20. In this embodiment, print jobs are uploaded from one location (e.g., a first hotel) and are retrieved at a second location (e.g., a second hotel). In sum, the hotel guest connects their laptop to a network port in their hotel room and performs the upload operation. The hotel room's port ID is uploaded with the print job and the printing service provider server queries the hotel server corresponding to the port ID for a username of the guest. The printing service provider server provides the print job data files and the username to the data warehouse server which stores the print job and the corresponding username. Then, the hotel guest can retrieve the print job at any hotel (or other location).

To retrieve their print job, the guest can swipe their room key (FIG. 19) or some other type of identification card (such as a hotel rewards card, credit card, etc.) at a printer in a hotel (possibly a different hotel than the one from which the print job was uploaded). The room key or identification card information is transmitted from the printer to the printing service provider server. The printing service provider then queries the hotel server for the hotel in which the printer is installed for a username corresponding to either the room key or the identification card information. If the room key is used, the hotel server determines the guest's username and provides it to the printing service provider server. If the identification card information is used, the hotel server first determines whether the identification card information is valid (i.e., if it can process the information to obtain a username). If the information is valid, the hotel server determines the guest's username and provides it to the printing service provider server. If it is not valid, the hotel server informs the printing service provider server of the same. Having received the username, the printing service provider server can then process the printing request and transmit the print job(s) to the printer.

Figure 18:
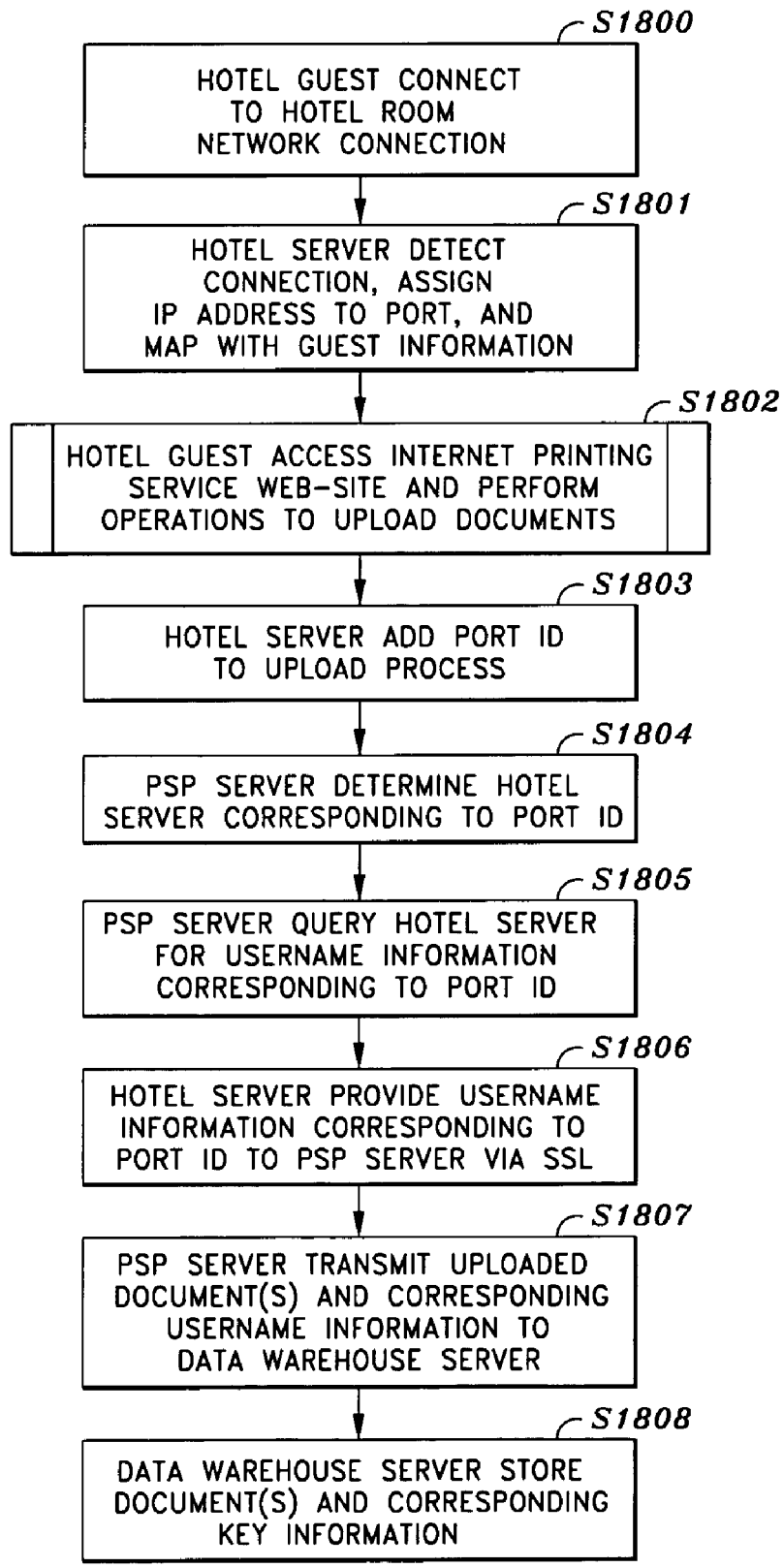
FIG. 18 is a flowchart of process steps for uploading a print job with a printing service provider server querying a hotel server for a username.

Referring now to FIG. 18, process steps for uploading a print job with a printing service provider server querying a hotel server for a username will be described. The process of FIG. 18 is similar to the process of FIG. 7. Steps S1800 to S1802 are the same as steps S700 to S702, respectively. To summarize, a hotel guest connects their laptop computer to a network connection in their hotel room (S1800). The hotel server, utilizing DHCP, then assigns a network IP address to the hotel room port (S1801). The hotel guest then performs a process to upload data files for printing (S1802).

In step S1803, the network IP address of the hotel room port is uploaded with the print job to the printing service provider server, along with the print data files. Upon receiving the print data files and the port IP address, the printing service provider server determines the hotel server corresponding to the port IP address (step S1804). In this regard, the printing service provider server (or alternatively, the data warehouse server) stores a listing of hotel server's and corresponding network IP address ranges. Having received the port IP address, the printing service provider server can determine the network address for the hotel server corresponding to the port IP address. Of course, if the listing is maintained in the data warehouse server, the printing service provider server would merely query the data warehouse server for the hotel server address corresponding to the port IP address.

Having determined the hotel server network address, the printing service provider server queries the hotel server for a username of the guest registered in the hotel room corresponding to the mapped room port IP address (step S1805). It should be noted that the username can be virtually any type of unique identification information and need not be a username per se. However, the type of username information used should be universal across all hotel chains (as well as any other clients that are part of the Internet printing service) so that the guest can retrieve their print job from any location. Some examples of usernames that may be utilized include a credit card number, a hotel advantage or reward card number, an email address or home telephone number of the guest, etc. Of course, if a hotel advantage or reward card were used, each hotel would need to be able to recognize cards for different hotel chains, otherwise the guest would be limited to retrieving their print job from within the same hotel chain. Returning to FIG. 18, the hotel server determines the appropriate username of the guest and transmits it to the printing service provider server, preferably via a secure connection like SSL (step S1806).

The printing service provider server then transmits the print data files and the username to the data warehouse server (step S1807) where the information is stored to await printing (step S1808).

While the foregoing description provides for uploading the port IP address, and the printing service provider server querying the hotel server for the username, other uploading processes could be used to upload the username. For instance, the guest could provide the username theirself during the uploading process, thereby obviating the need for the printing service provider server to query the hotel server. Regardless of how the username is uploaded to the printing service provider server, the present embodiment is directed toward a guest being able to print their print jobs at any hotel once the print jobs have been uploaded. The process of retrieving a print job at a different hotel than the one from which the print job was uploaded will now be described with regard to FIGS. 19 and 20. In FIG. 19, the hotel guest retrieves their print job by swiping their room key at the printer, whereas in FIG. 20, the print job is retrieved by swiping some type of identification card (such as a credit card, a hotel rewards card, etc.).

Figure 19B:
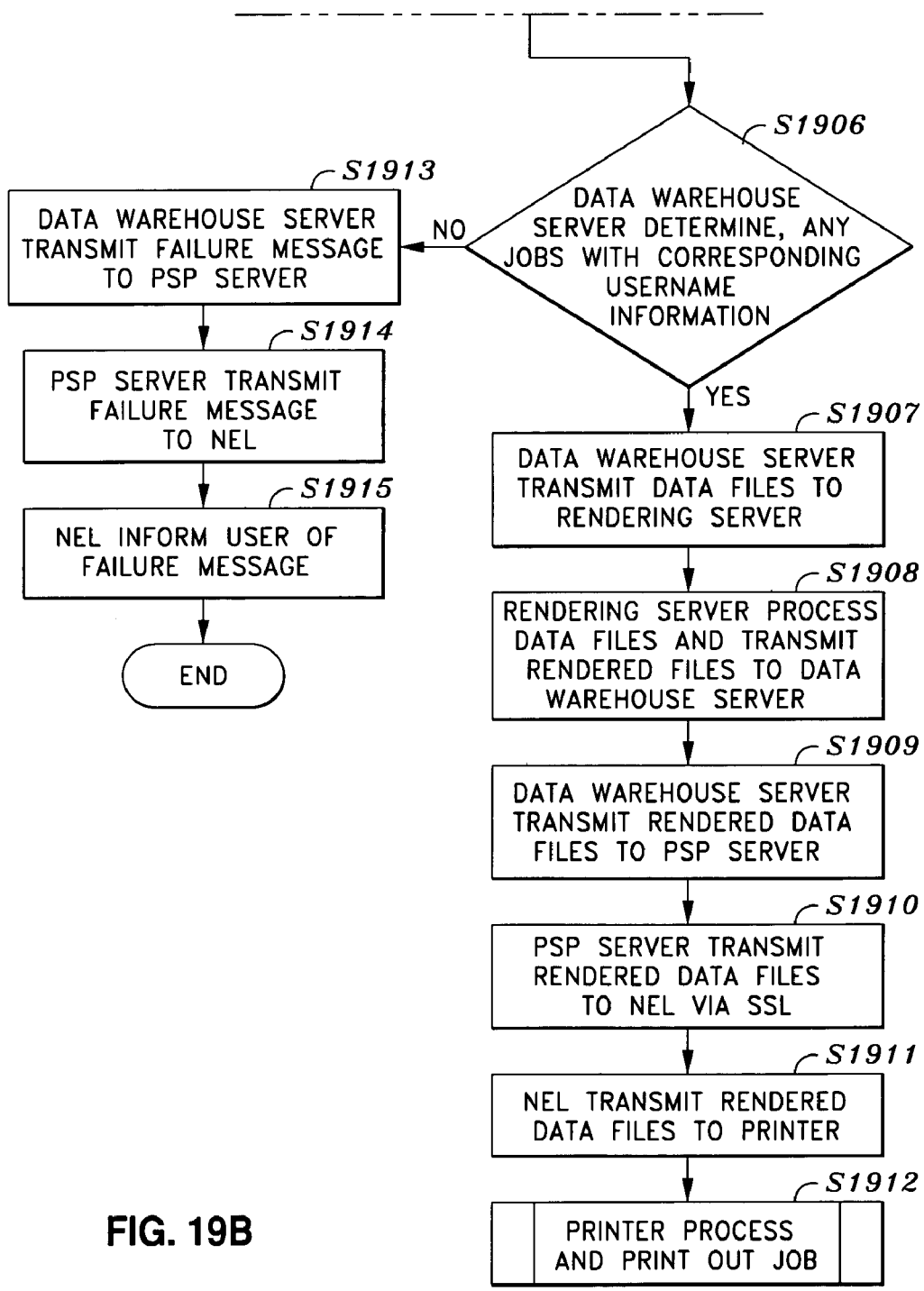
FIG. 19 is a flowchart of process steps for retrieving a print job at a different hotel than where the print job was uploaded utilizing a room key.

Referring to FIG. 19, a process of retrieving a print job at a different hotel than where the print job was uploaded utilizing a room key will be described. It should be noted that the print job need not have been uploaded from a different hotel per se. Rather, the print job could have been uploaded by the guest from their home or office prior to embarking on a business trip. Alternatively, the print job could have been uploaded by a third party from virtually any location. In this case, the third party would of course need to have the guest's username available to be uploaded to the printing service provider server. As such, if the username employed is, for example, an email address, any third party could upload a document to the printing service provider server with the guest's username, but the print job can only be printed by a person whose email address is correlated with the hotel room key or other identification card.

In step S1900, the hotel guest, having previously registered with and checked into the hotel and the hotel having the guest's information available on a database in its server, swipes their room key at a printer in the hotel. The NEL attached to the printer, which as described above has a network address identifying it, transmits the room key information and its network identity to the printing service provider server (step S1901). The printing service provider server utilizes the NEL identity to determine the network address for the hotel server corresponding to the hotel in which the printer is installed (step S1902). Having determined the hotel server address, the printing service provider server queries the hotel server for the username of the guest corresponding to the room key information (step S1903). Upon receiving the room key information from the printing service provider server, the hotel server queries its database to determine the guest's username and transmits the username to the printing service provider server (step S1904).

The remaining process steps of FIG. 19 are the same as those described in FIG. 17. Namely, steps S1905 to S1912 are the same as steps S1711, S1712 and S1715 to S1720, respectively, with one difference being the use of a username instead of a credit card, and steps S1913 to S1915 are the same as steps S1714, S1708 and S1709, respectively. Accordingly, the description provided for above for these steps applies equally for FIG. 19 and therefore, will not be repeated here.

Figure 20B:
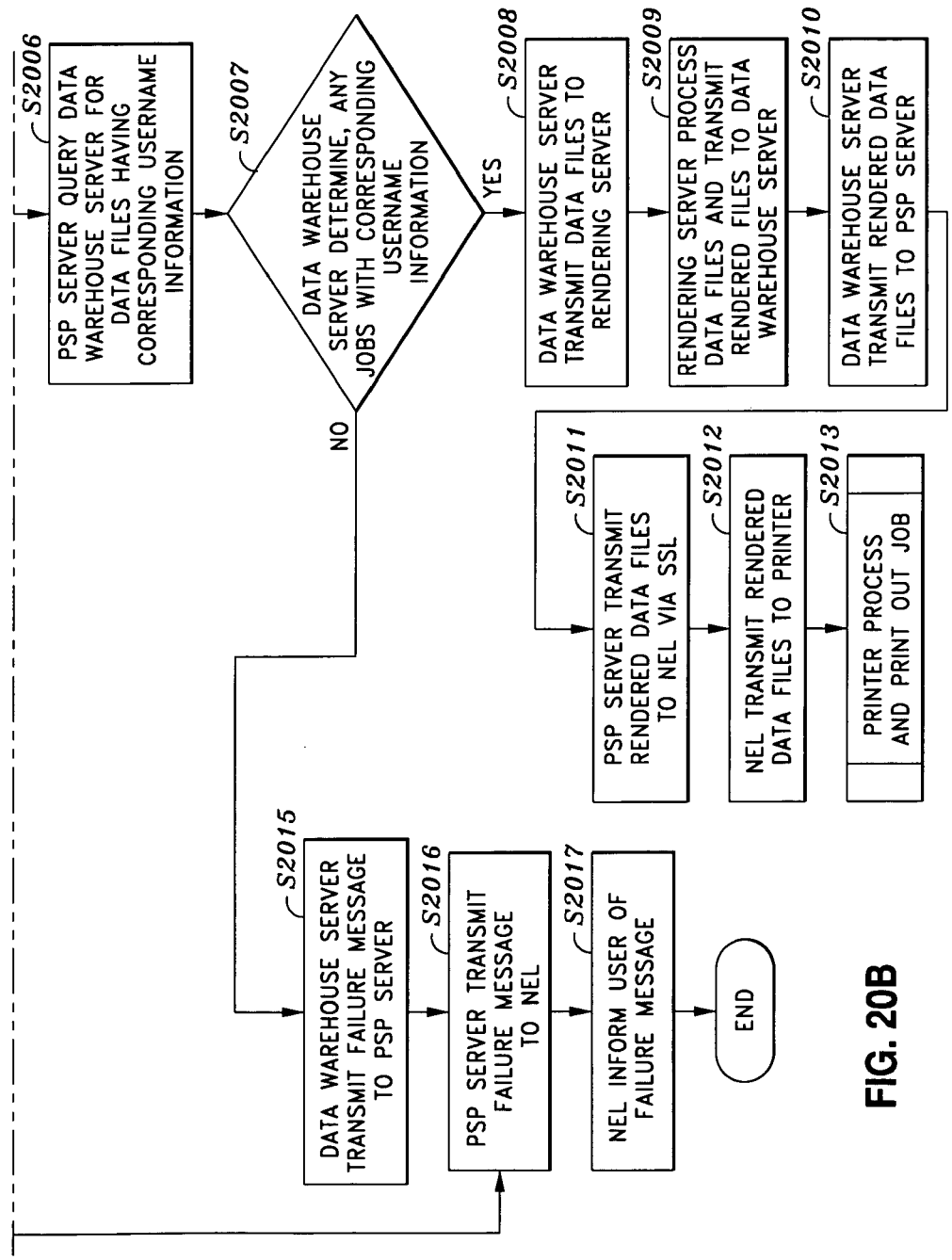
FIG. 20 is a flowchart of process steps for retrieving a print job at a different hotel than where the print job was uploaded utilizing some type of identification card.

FIG. 20 is a flowchart of process steps for retrieving a print job at a different hotel than where the print job was uploaded utilizing some type of identification card. In FIG. 19, the hotel guest utilizes their room key card to retrieve their print job. However, in some instances the guest may want to utilize some type of identification card instead to retrieve their print jobs. For instance, they may want to use their credit card or a hotel rewards card in order to receive points or rewards for the use of such a card. FIG. 20 describes how such a process is performed. In FIG. 20, the type of card used is referred to generally as an identification (ID) card.

In step S2000, the hotel guest swipes their ID card at the hotel printer. The NEL attached to the printer establishes a connection with the printing service provider server and transmits the ID card information and the NEL's identity information to the printing service provider server, preferably via a secure connection such as SSL (step S2001). Upon receiving the ID card information and the NEL identity, the printing service provider server determines the hotel server network address corresponding to hotel in which the printer (and of course, the NEL) are installed (step S2002). The printing service provider server then queries the hotel server for the username of the guest corresponding to the ID card information (step S2003).

The hotel server then determines whether there are any guests registered at the hotel that match the ID card information (step S2004). In this regard, encompassed within step S2004's determination is a determination by the hotel server whether the ID card information is recognizable (i.e., a valid type of information that the hotel server can process). That is, if the hotel in which the guest is registered and swipes their ID card is, for example, the Ramada hotel chain, but the ID card is a rewards card for the Hilton hotel chain, then the Ramada hotel server may not be able to recognize the card information. In such a case, an error message would be returned by the hotel server (step S2014). Additionally, even if the hotel server can recognize and process the ID card, if a guest does not match the ID card information, the hotel server will return a failure message as well (step S2014). This may the case where the card used is lost or stolen. If a failure message is returned from the hotel server to the printing service provider server, then the printing service provider server informs the NEL of the same (step S2016) and the NEL in turn informs the user of the same (step S2017). If the hotel server is able to recognize and process the ID card information, then the hotel server determines the username for the guest corresponding to the ID card information and transmits the same to the printing service provider server (step S2005).

Steps S2006 to S2013 are the same as steps S1905 to S1912, respectively, and steps S2015 to S2017 are the same as steps S1913 to S1915, respectively. Accordingly, the foregoing description of FIG. 19 applies equally to these steps and the description thereof will not be repeated here.

Each of the foregoing embodiments provide a way for a hotel guest to utilize a hotel's Internet printing system, where the guest uploads data files for printing and retrieves the data files at the printer by presenting their room key to the printer. As such, in each of the foregoing embodiments the hotel guest was the source of the uploaded the data file. However, as briefly stated above, the guest is not necessarily required to be the one to upload the data files, but rather, the guest could utilize the hotel's Internet printing system to print out data files uploaded by someone else. For example, the hotel guest could utilize their room key or a credit card to print out data files that have been uploaded by the hotel. For a better understanding, consider the following example.

In the hotel environment, when a guest is scheduled to check-out of the hotel, the guest can check-out in any one of several ways. One way is for the guest to wait in a line at the hotel's front desk and check-out with a hotel clerk. Another may be for the guest to utilize a video check-out on the television in their room. Yet another way may be for the guest to simply drop their room key in a drop box in the hotel lobby, or to leave the key in their hotel room. With the first technique, the guest may have to wait in line for a substantial period of time behind other guests, and to wait for the hotel's staff to check the guest's room for any additional charges that have not been recorded, such as mini-bar charges. However, they will be able to obtain a printed copy of all of their room charges from the hotel clerk. In the second technique, the guest can view all of the room charges that have been recorded in the hotel's database, charges that generally exclude any last minute amenity charges such as mini-bar charges. However, a printed copy of the guest's bill is generally not provided to the guest, but rather, is mailed to the guest sometime after check-out. With the third technique, the hotel guest can not view the hotel charges and must wait until a final billing statement is mailed to them. Of course, some hotels print out a bill of the guest's incurred charges and, during the early morning hours on the day the guest is scheduled to check-out, leave the bill attached to the door of the guest's room. However, like the video check-out technique, any last minute charges are not included on this billing statement and the guest must wait for a final bill to be mailed to them.

With the present invention's Internet printing system, the hotel guest is able to obtain a printed copy of their billing statement without having to wait in line at the front desk. In this regard, the hotel can upload a data file that includes the guest's billing statement to the Internet printing service provider. At check-out time, the guest can utilize a video check-out to view their room charges and check-out of the hotel. An option may be provided with the video check-out to request whether the guest wants to print out a copy of their bill utilizing the hotel's Internet printing service. If the guest does want to print out a copy of their bill, the guest may be informed that they can print out their bill on one of the hotel's printers by swiping their room key. The guest may also be informed that the printout may be available within a predetermined time, ten minutes for example. In this manner, when the guest completes the video check-out, the hotel staff may be informed that the guest has checked and the staff can then check the guest's room for any last minute charges that can then be added to the guest's bill. Therefore, when the guest prints out their bill, all incurred charges will be included on the billing statement. Moreover, the hotel can include any charges for use of the Internet printing service on the guest's bill for printing out their final billing statement. Therefore, as can readily be seen by the foregoing, the guest can utilize the fast and convenient video check-out and can avoid waiting in line at the front desk, but can also have a printed copy of their hotel bill readily available by the time they leave the hotel lobby, where all of the guest's charges are included on the bill. After swiping their room key at the hotel's printer, the guest can then deposit their room key in a drop box located next to the printer.

The operation of the foregoing embodiment may be similar to that described above with regard to FIGS. 5 and 6, with one difference being that the hotel server selects the data file to upload (a data file containing the guest's bill), and the hotel server uploading the selected file and the guest's room key information to the Internet printing service provider server.

Of course, video check-out is not necessarily required to initiate uploading of a data file containing the guest's bill. In this regard, the hotel server could periodically (e.g., daily or on the scheduled check-out date) upload the data file and the guest's room key information. In this manner, the guest need not utilize the video check-out, but can still obtain a printed copy of their billing statement merely by swiping their room key at the hotel's printer when the leave the hotel. However, in this case, the guest's bill may not include any last minute charges since the hotel may not know that the guest is leaving the hotel (i.e., the hotel is only aware that the guest is scheduled to check-out, but does not know the exact time when the guest will actually leave the hotel) and therefore may not have time to check the guest's room for any last minute charges and have them added to the bill.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method of printing over a network, comprising the steps of:
    correlating and storing at a first server user identification information of a user with location information corresponding to a location of the user;
    uploading, via the network, to a printing service provider, print data information and location information corresponding to a location from which the uploading is performed;
    determining, at the printing service provider, from the uploaded information by referring to the first server the correlated user identification information and location information, user identification information of the user corresponding to the uploaded location information;
    correlating and storing, at the printing service provider, the determined user identification information of the user corresponding to the uploaded location information with the uploaded print data information;
    inputting the user identification information at a printing device connected to the network;
    transmitting the print data information having the correlated user identification information from the printing service provider to the printing device; and
    printing the print data information on the printing device.

2. A method according to claim 1, wherein the location information comprises a network address from which the uploading step is initiated.

3. A method according to claim 2, wherein the network address is dynamically determined when a user connects a computing device, from which the uploading step is to be performed, to the network.

4. A method according to claim 3, wherein the network address is dynamically determined by a hotel server when the user connects the computing device to a network connection in a hotel.

5. A method according to claim 1, further comprising the steps of:
    after the uploading step, the printing service provider querying a server corresponding to the location information for the user identification information corresponding to the location information;
    the server corresponding to the location information performing the determining step in response to receiving the query from the printing service provider; and
    the server corresponding to the location information transmitting the determined user identification information to the printing service provider.

6. A method according to claim 5, wherein the location information comprises hotel information, the server corresponding to the location information comprises a hotel server, and the user identification information comprises room key information.

7. A method according to claim 1, wherein the location information comprises hotel information and the user identification information comprises hotel room key information.

8. A method according to claim 1, wherein the identification information is credit card information.

9. A server apparatus that performs computer executable process steps for printing over a network, comprising:
    a processor for executing computer executable process steps; and
    a memory medium storing the computer executable process steps, the computer executable process steps comprising (a) correlating and storing user identification information and network address corresponding to a user's location, (b) detecting connection of a client computer to a local area network connected to the server apparatus, (c) assigning a network address to the detected client computer, (d) receiving a query from another server apparatus connected to the network for user identification information corresponding to the assigned network address, (e) determining, by referring to the correlated user identification information and network address, the user identification information corresponding to the assigned network address received in the query, and (f) responding to the query from the another server apparatus with the determined user identification information.

10. A server apparatus according to claim 9, wherein the user identification information is room key information.

11. A server apparatus according to claim 9, wherein the user identification information is credit card information.

12. A server apparatus according to claim 9, further comprising, after the assigning step and prior to the receiving step, adding the assigned network address to an upload operation in which print data information and the assigned network address are uploaded to the another server apparatus.

13. A server apparatus according to claim 12, wherein the another server apparatus comprises a printing service server that receives the print data information and the assigned network address in the upload operation, and queries the server apparatus for the user identification information.

14. A server apparatus that performs computer executable process steps for printing over a network, comprising:
   a processor for executing computer executable process steps; and
   a memory medium storing the computer executable process steps, the computer executable process steps comprising (a) receiving, via the network, uploaded print data information and location information corresponding to a location from which the uploading is performed, (b) querying another server apparatus corresponding to the uploaded location information for user identification information of a user corresponding to the uploaded location information, wherein the another server apparatus has previously correlated user identification information of the user and the received location information, (c) receiving the user identification information from the another server apparatus in response to the query, (d) storing the received user identification information of the user corresponding to the uploaded location information in correspondence with the uploaded print data information, (e) receiving the user identification information from a printing device, and (f) in response to the received user identification information from the printing device, transmitting to the printing device the print data information stored in correspondence to the user identification information.

15. A server apparatus according to claim 14, wherein the location information is a network address assigned to a client computer by the another server, and the client computer performs an uploading operation to upload the print data information and the assigned network address which are received by the server apparatus.

16. A server apparatus according to claim 15, wherein the user identification information comprises room key information.

17. A server apparatus according to claim 15, wherein the user identification information is credit card information.

18. A method of printing over a network, comprising the steps of:
   correlating and storing at a first server user identification information of a user with room key information;
   uploading, via the network, to a printing service provider, print data information, location information corresponding to a location from which the uploading is being performed, and user identification information corresponding to the location information;
   determining, at the printing service provider, room key information based on the uploaded user identification information by referring to the first server the correlated user identification information and room key information;
   correlating, at the printing service provider, the determined room key information with the uploaded print data information;
   inputting the room key information at a printing device connected to the network;
   transmitting the print data information having the correlated room key information from the printing service provider to the printing device; and
   printing the print data information on the printing device.

19. A method according to claim 18, wherein the location information identifies a hotel and the user identification information identifies a hotel guest.

20. A method according to Clam 19, wherein the user identification information is issued to the hotel guest by the hotel.

21. A method according to claim 18, wherein the room key information is hotel room key information.

22. A method according to claim 18, wherein the user identification information is credit card information.

23. A method according to claim 18 further comprising the steps of:
   after the uploading step, the printing service provider determining a server corresponding to the uploaded location information;
   the printing service provider querying the determined server corresponding to the uploaded location information for the room key information based on the uploaded user identification information;
   the determined server performing the determining step to determine the room key information based on the uploaded user identification information; and
   the determined server transmitting the determined room key information to the printing service provider.

24. A computer-readable storage medium on which is stored computer executable code for printing over a network, the computer executable code comprising the steps of:
   uploading, via the network, to a printing service provider, print data information and location information corresponding to a location from which the uploading is performed;
   correlating and storing at a first server user identification information of a user with location information corresponding to a location of the user;
   determining, at the printing service provider, form the up loaded location information by referring to the first server correlated user identification information and location information, user information of the user corresponding to the uploaded location information;
   correlating, at the printing service provider, the determined user identification of the user corresponding to the uploaded location information with the uploaded print data information;
   inputting the user identification information at a printing device connected to the network;
   transmitting the print data information having the correlated user identification information form the printing service provider to the printing device; and printing the print data information on the printing device.

25. A computer-readable medium according to claim 24, wherein the computer executable code further comprises the steps of:
   after the uploading step, the printing service provider querying a server corresponding to the location information for the user identification information corresponding to the location information;
   the server corresponding to the location information performing the determining step in response to receiving the query from the printing service provider; and
   the server corresponding to the location information transmitting the determined identification information to the printing service provider.

* * * * *

UNITED STATES PATENT AND TRADEMARK OFFICE
CERTIFICATE OF CORRECTION

PATENT NO.         : 7,315,824 B2
APPLICATION NO. : 10/000468
DATED              : January 1, 2008
INVENTOR(S)        : Chen et al.

It is certified that error appears in the above-identified patent and that said Letters Patent is hereby corrected as shown below:

<u>COLUMN 6</u>:
    Line 35, "and" should read -- an --.

<u>COLUMN 7</u>:
    Line 65, "to" should be deleted.

<u>COLUMN 13</u>:
    Line 18, "for" should be deleted.

<u>COLUMN 15</u>:
    Line 54, "their" should read -- to their --.

<u>COLUMN 16</u>:
    Line 14, "An" should read -- A --.

<u>COLUMN 20</u>:
    Line 34, "hotel's" should read -- hotels --.

<u>COLUMN 23</u>:
    Line 67, "a" should read -- an --.

<u>COLUMN 27</u>:
    Line 47, "hotel" should read -- the hotel --; and
    Line 66, "may" should read -- may be --.

<u>COLUMN 28</u>:
    Line 18, "the" (fourth occurrence) should be deleted; and
    Line 45, "can not" should read -- cannot --.

<u>COLUMN 29</u>:
    Line 29, "the" (second occurrence) should read -- they --.

UNITED STATES PATENT AND TRADEMARK OFFICE
CERTIFICATE OF CORRECTION

PATENT NO. : 7,315,824 B2
APPLICATION NO. : 10/000468
DATED : January 1, 2008
INVENTOR(S) : Chen et al.

It is certified that error appears in the above-identified patent and that said Letters Patent is hereby corrected as shown below:

COLUMN 32:
       Line 4, "Claim 19," should read -- claim 19, --;
       Line 35, "form" should read -- from --; and
       Line 47, "form" should read -- from --.

Signed and Sealed this

Fourth Day of November, 2008

JON W. DUDAS
*Director of the United States Patent and Trademark Office*